(12) United States Patent
Wang et al.

(10) Patent No.: US 6,747,066 B2
(45) Date of Patent: Jun. 8, 2004

(54) SELECTIVE REMOVAL OF OXYGEN FROM SYNGAS

(75) Inventors: Daxiang Wang, Ponca City, OK (US); Harold A. Wright, Ponca City, OK (US); Beatrice C. Ortego, Ponca City, OK (US); Sinh Trinh, Ponca City, OK (US); Rafael Espinoza, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 104 days.

(21) Appl. No.: 10/219,108

(22) Filed: Aug. 15, 2002

(65) Prior Publication Data

US 2003/0153632 A1 Aug. 14, 2003

Related U.S. Application Data

(60) Provisional application No. 60/353,822, filed on Jan. 31, 2002, and provisional application No. 60/353,774, filed on Jan. 31, 2002.

(51) Int. Cl.$^7$ .......................... C07C 27/00; C07C 1/02; C01B 3/26; C01B 13/00; C01B 17/16
(52) U.S. Cl. .................. 518/700; 518/702; 518/703; 252/373; 423/651; 423/219; 423/230
(58) Field of Search ................. 518/700, 702, 518/703; 252/373; 423/651, 219, 230

(56) References Cited

U.S. PATENT DOCUMENTS

| | | | |
|---|---|---|---|
| 3,812,035 A | 5/1974 | Krenowicz et al. ............ 252/59 |
| 3,996,105 A | 12/1976 | Harrison et al. .............. 195/28 |
| 4,269,940 A | 5/1981 | Patel et al. .................. 435/148 |
| 4,318,784 A | 3/1982 | Higgins et al. ............... 204/73 |
| 4,587,216 A | 5/1986 | Patel et al. .................. 435/123 |
| 4,800,189 A | 1/1989 | Eschwey et al. ............. 502/400 |
| 4,827,043 A | 5/1989 | Butler ........................ 568/492 |
| 5,128,060 A | 7/1992 | Ueno et al. .................. 252/184 |
| 5,192,672 A | 3/1993 | Lipscomb .................... 435/155 |
| 5,446,232 A | 8/1995 | Chen et al. .................. 585/845 |
| 5,453,211 A | 9/1995 | Alward ........................ 252/45 |
| 5,484,580 A | 1/1996 | Sharma ....................... 423/219 |
| 5,607,572 A | 3/1997 | Joshi .......................... 205/763 |
| 5,714,379 A | 2/1998 | Phipps, Jr. .................. 435/266 |
| 5,730,003 A | 3/1998 | Nguyen et al. ............... 62/648 |
| 5,958,757 A | 9/1999 | Steffan et al. ........... 435/262.5 |
| 5,985,649 A | 11/1999 | Stensel et al. .............. 435/266 |
| 6,019,810 A | 2/2000 | Phillips et al. ................ 55/512 |
| 6,025,305 A | 2/2000 | Aldrich et al. .............. 508/110 |
| 6,043,288 A | 3/2000 | DeGeorge et al. .......... 518/715 |
| 6,103,773 A | 8/2000 | Wittenbrink et al. ....... 518/702 |
| 6,147,126 A | 11/2000 | DeGeorge et al. .......... 518/715 |
| 6,169,120 B1 | 1/2001 | Beer .......................... 518/715 |
| 6,254,946 B1 | 7/2001 | Hirata et al. .............. 428/35.2 |
| 6,277,338 B1 | 8/2001 | Agee et al. ................. 422/189 |

(List continued on next page.)

OTHER PUBLICATIONS

Structured Catalysts and Reactors. A. Cyulski and J.A. Moulijn (eds.), Marcel Dekker Inc., 1998 (p. 599–615).

(List continued on next page.)

*Primary Examiner*—J. Parsa
(74) *Attorney, Agent, or Firm*—Conley Rose

(57) ABSTRACT

The present invention is an improvement in the preparation of liquid hydrocarbons from natural gas/methane, oxygen and/or steam. In particular, the present invention relates to processes for the production of synthesis gas, reducing the oxygen concentration from the synthesis gas, and the production of liquid hydrocarbons using the oxygen reduced synthesis gas as a feedstock. More particularly, the present invention described herein identifies catalyst compositions, apparatus and methods of using such catalysts and apparatus for preparing liquid hydrocarbons via oxygen reduced synthesis gas all in accordance with the present invention.

35 Claims, 8 Drawing Sheets

U.S. PATENT DOCUMENTS

| | | | |
|---|---|---|---|
| 6,287,653 B1 | 9/2001 | Speer et al. | 428/35.4 |
| 6,351,971 B1 | 3/2002 | Nguyen et al. | 62/648 |
| 6,369,148 B2 | 4/2002 | Chiang et al. | 524/417 |
| 6,376,434 B1 | 4/2002 | Katafuchi | 508/291 |

OTHER PUBLICATIONS

U. Balachandran et al., *Dense Ceramic Membranes for Partial Oxidation of Methane to Syngas*, Applied Catalysis A: General 133, 1995 (p. 19–29).

Jonghee Han et al., *Oxygen Permeation Through Flourite-Type–Bismuth–Yttrium–Copper Oxide Membranes*, Journal of Membrane Science, 132 (1997) p. 235–243.

H.J.M. Bouwmeester et al., *Oxygen Semipermeability of Erbia–Stabilized Bismuth Oxide*, Solid State Ionic, 53–56 (1992) p. 460–468

Shenglin Liu et al., *Effects of Alkali and Rate Earth Metal Oxides on the Thermal Stability and the Carbon–Deposition over Nickel Based Catalyst*, Study of Surface Science and Catalyst, 119 (1998) p. 747–52.

Chung–Yi Tsai et al., *Dense Perovskite, $La_{1-x}A_xFe_{1-y}Co_yO_{3-\delta}$ (A=Ba,Sr,Ca), Membrane Synthesis, Applications and Characterization*, J. Am. Ceram. Soc. 81 [6] p. 1437–1444 (1998).

L.M. van der Haar et al., *Homogeneous Porous Perovskite Supports for Thin Dense Oxygen Separation Membranes*, Journal of Membrane Science, 180 (2000) p. 147–155.

Schulz et al., *Applied Catalyst vol. 186 Nos. 1,2 Oct. 1999 (229 p).*

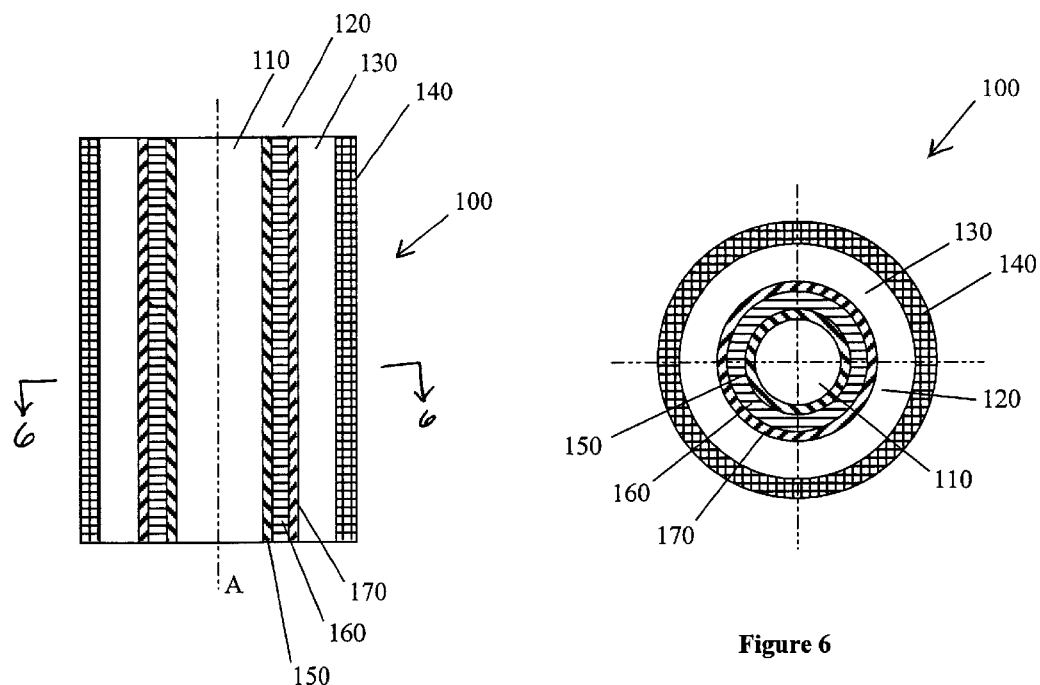
Figure 5
Figure 6
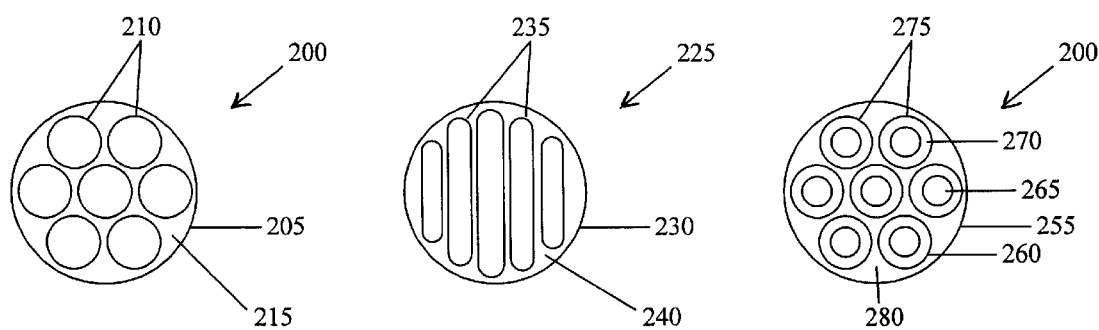
Figure 7
Figure 8
Figure 9

SELECTIVE REMOVAL OF OXYGEN FROM SYNGAS

CROSS-REFERENCE TO RELATED APPLICATIONS

This application claims the benefit of application Ser. Nos. 60/353,822 filed on Jan. 31, 2002, entitled Oxygen Selective Membrane To Remove Oxygen From Syngas, and 60/353,774 filed on Mar. 12, 2002, entitled Oxygen Selective Membrane To Remove Oxygen From Syngas.

STATEMENT REGARDING FEDERALLY SPONSORED RESEARCH OR DEVELOPMENT

Not applicable.

FIELD OF THE INVENTION

The present invention generally relates to the preparation of liquid hydrocarbons from natural gas/methane, oxygen and/or steam. In particular, the present invention relates to improved methods for preparing liquid hydrocarbons from improved feedstock streams.

BACKGROUND OF THE INVENTION

Large quantities of methane, the main component of natural gas, are available in many areas of the world, and natural gas is predicted to outlast oil reserves by a significant margin. However, most natural gas is situated in areas that are geographically remote from population and industrial centers. The costs of compression, transportation, and storage make its use economically unattractive.

To improve the economics of natural gas use, much research has focused on methane as a starting material for the production of higher hydrocarbons and hydrocarbon liquids. The conversion of methane to hydrocarbons is typically carried out in two steps. In the first step, methane is reformed with water to produce carbon monoxide and hydrogen (i.e., synthesis gas or syngas). In a second step, the syngas intermediate is converted to higher hydrocarbon products by processes such as the Fischer-Tropsch Synthesis. For example, fuels with boiling parts in the middle distillate range, such as kerosene and diesel fuel, and hydrocarbon waxes may be produced from the synthesis gas.

Current industrial use of methane as a chemical feedstock proceeds by the initial conversion of methane to carbon monoxide and hydrogen by either steam reforming or dry reforming. Steam reforming currently is the major process used commercially for the conversion of methane to synthesis gas, the reaction proceeding according to Reaction (1).

$$CH_4 + H_2O \leftrightarrows CO + 3H_2 \qquad (1)$$

Although steam reforming has been practiced for over five decades, efforts to improve the energy efficiency and reduce the capital investment required for this technology continue. The steam reforming reaction is endothermic (the heat of reaction (1) is about 9 kcal/mol of methane), requiring the expenditure of large amounts of fuel to produce the necessary heat for the industrial scale process. Another drawback of steam reforming is that for many industrial applications, the 3:1 ratio of $H_2$:CO products is problematic, and the typically large steam reforming plants are not practical to set up at remote sites of natural gas formations.

The catalytic partial oxidation ("CPOX") of hydrocarbons, e.g., methane or natural gas, to syngas has also been described in the literature. In catalytic partial oxidation, natural gas is mixed with air, oxygen-enriched air, or oxygen, and introduced to a catalyst at elevated temperature and pressure. The partial or direct oxidation of methane yields a syngas mixture with a $H_2$:CO ratio of 2:1, as shown in Reaction (2):

$$CH_4 + \tfrac{1}{2}O_2 \leftrightarrows CO + 2H_2 \qquad (2)$$

The $H_2$:CO ratio for this reaction is more useful for the downstream conversion of syngas to chemicals such as methanol or other fuels than is the $H_2$:CO ratio from steam reforming. In addition, the CPOX reaction is exothermic (−8.5 kcal/mol), in contrast to the endothermic steam reforming reaction. Furthermore, oxidation reactions are typically much faster than reforming reactions. This allows the use of much smaller reactors for catalytic partial oxidation processes than is possible in a conventional steam reforming process. All of these factors lower the cost for the conversion of methane or natural gas and make the CPOX reaction much more attractive for commercial use.

After syngas is obtained through the above-mentioned process, it is then converted to higher hydrocarbons (paraffins in the range of C5 to C20) by a variety of liquid hydrocarbon synthesis processes. One such process is via Fischer-Tropsch (FT) synthesis using a metal catalyst, through Reaction (3).

$$CO + 2H_2 \rightarrow 1/n(C_nH_{2n}) + H_2O \qquad (3)$$

There are primarily two broad types of catalyst used in FT synthesis: Fe-based catalysts and Co-based catalysts. The literature is replete with discussions of these catalysts and their varying compositions. Cobalt catalysts are generally considered a better match for the conversion of methane or natural gas derived syngas. For these catalysts, sulfur and oxygen are poisons that must be removed from the feedstock. It is known that sulfur will permanently deactivate a cobalt catalyst when present in concentrations of 50 ppb or greater. It has recently been discovered that oxygen can temporarily or even permanently deactivate a cobalt based catalyst when present even in very low amounts. The term "non-toxic" will be used herein to describe a syngas stream having an oxygen concentration at or below a level that is acceptable for whatever application the syngas is to be used downstream, including catalytic FT synthesis.

The concentration of oxygen in syngas is typically determined by the reactive process used to derive the syngas. Traditional methods for producing synthesis gas, including steam methane reforming and auto-thermal reforming, are characterized by relatively long periods of reactant exposure to the catalyst beds. Long exposure times allow the reaction to consume any unconverted oxygen that may remain in the syngas.

Due to the commercial importance of syngas, there is a continuing effort to maximize the efficiency of syngas and liquid hydrocarbon productivity by developing new methods for preparing syngas. Smaller catalyst beds and shorter exposure times characterize some of these new methods. These new reactors are commonly referred to as short contact time reactors (SCTR). There are several advantages to short contact time reactors, i.e., increased productivity due to higher space velocities, smaller volumes of catalyst needed, smaller catalyst beds, etc.

In spite of the benefits, there is a greater opportunity for oxygen to pass through the reactor unconverted. One such opportunity for oxygen to pass through the reactor unconverted is due to the increased velocity of the gas through a thin fixed bed reactor. The traditional methods mentioned above generally have gas hourly space velocities (GHSV, the standard volume of gas flow through per volume of catalyst per hour) near 4,000 per hour, whereas the new SCTR designs can have GHSV as great as 1,000,000 per hour or higher. Oxygen breakthrough can result due to the millisecond residence time of the reactants. The higher space velocities also force gas to pass through "short cut channels" the catalyst bed or fractures in the insulation refractory before it can be exposed to the active catalyst resulting in increased concentrations of unconverted oxygen in the syngas product.

In addition, it is well known in the art that catalysts "age" with time and use. Aging occurs for a variety of reasons including coke deposition, poisoning, etc. The more aged a particular catalyst is the less efficient the catalyst is at initiating reaction, i.e., less activity it has. As the catalyst ages more oxygen may pass through the bed unconverted.

For at least these reasons, some oxygen is able to pass through a syngas reactor without being converted. This increase in the unconverted oxygen concentration can lead to a decrease in efficiency of the downstream Fischer-Tropsch process due to oxidation or poisoning of the catalysts. Hence, in natural-gas derived syngas, especially those obtained from short contact time selective oxidation processes, there exists up to 0.5(vol.) % oxygen, which can deactivate FT catalysts within several hours. Frequent regeneration of FT catalysts not only increases the difficulty of operation, but also significantly increases the associated costs.

Therefore, it is desired to decrease the oxygen concentration of the syngas by providing a method and apparatus for removing oxygen that remains in the syngas before the syngas is used in any downstream process, particularly a Fischer-Tropsch reaction.

SUMMARY OF THE INVENTION

The present invention is directed towards producing liquid hydrocarbons from a hydrocarbon containing gas and an oxygen containing gas or steam. The invention is identified as a process for converting methane to liquid hydrocarbons comprising (a) reacting hydrocarbon-containing gas, such as methane or natural gas with oxygen, air or some other oxygen source in a syngas reactor to produce syngas; (b) decreasing the amount unconverted oxygen in the syngas stream of step (a) to produce a non-toxic stream of syngas; and (c) reacting the non-toxic stream of syngas from step (b) in a synthesis reactor, i.e., Fischer-Tropsch reactor, to produce liquid hydrocarbons. Non-toxic streams of syngas are generally referred to as having preferably less than 1000 ppm, more preferably less than 100 ppm, and more preferably less than 10 ppm oxygen.

Catalyst compositions, apparatus and methods for the removal of oxygen are also identified as a means to achieve the present invention in accordance with the preferred embodiments. The oxygen removal process can be achieved by any means known in the art, however, the following techniques are considered to be the preferred embodiments of the present invention: selective catalytic reaction of oxygen and other gases, such as CO, $H_2$ or $CH_4$, as shown in Reactions (4), (5) and (6), respectively;

$$2CO+O_2 \rightarrow 2CO_2 \quad (4)$$

$$H_2+\tfrac{1}{2}O_2 \rightarrow H_2O \quad (5)$$

$$CH_4+2O_2 \rightarrow 2H_2O+CO_2 \quad (6)$$

oxygen selective membranes (with and without catalyst coatings); adsorption beds or columns; pressure-swing adsorption through physisorption on molecular sieves; Fischer-Tropsch wax non-catalytic or catalytic oxidation to produce oxygenates in F-T product stream; consuming the oxygen as a reactant in the functionalization of higher hydrocarbons, i.e., using the oxygen to convert hydrocarbons to alcohols, aldehydes, ketones, acids, etc.; liquid absorption with medium containing phenols, alcohols, and the like; using longer residence times in vessel downstream of the catalytic bed to combust oxygen (burn $O_2$) through homogeneous reactions; methane oxidation via a secondary bed or layer in CoPOX reactor on a modified catalytic partial oxidation catalyst with greater $O_2$ selectivity; any Redox reaction occurring in adsorption bed, membrane, production of metal oxides; homogeneous catalysis for hydrogen peroxide ($H_2O_2$) production; cryogenic separation of $O_2$ from CO, $CH_4$ and $H_2$; biocatalytic reaction with cell-free enzymes such as but not limited to oxygenases, oxidoreductases, hydrogenases, or any combination thereof and in any form known in the art of biocatalysis such as but not limited to compounds immobilized, encapsulated, solubilized, purified, extracted from cells, as well as with whole organisms; respiration of organisms; biosorption; and any combination thereof.

Specific examples of these embodiments are disclosed herein. For example, metal and metal oxide catalysts are identified for the selective conversion of oxygen to carbon dioxide by reacting the oxygen and carbon monoxide (Reaction (4)) present in a gas stream such as a syngas product stream, a Fischer-Tropsch feedstock or other gas stream containing carbon monoxide.

According to the present invention, the preferred embodiment of the metal/metal oxide catalysts to remove unconverted-oxygen from these types of gas streams have the general formula $\alpha AO_x$-$\beta BO_y$-$\gamma CO_z$, wherein:

A is one of the precious metals Rh, Ru, Pd, Pt, Au, Ag, Os or Ir or is a transition metal chosen from the group consisting of Sc, Ti, V, Cr, Mn, Fe, Co, Ni, Cu, Zn, Nb, Mo, Tc, Hf, Ta, W, Re, preferably Fe, Co, Ni, Mn, V or Mo or any combination of the above;

B is a rare earth metal La, Ce, Pr, Nd, Pm, Sm, Eu, Gd, Th, Dy, Ho, Er, Tm, Yb, Lu, Sc, Y and Th, preferably La, Yb, Sm or Ce;

C is an element chosen from Group II (i.e., Be, Mg, Ca, Sr, Ba and Ra), III (i.e., B, Al, Ga, In, Tl) and IV (i.e., C, Si, Ge, Sn, Pb) elements of the Periodic Table of the Elements, preferably Mg, Al or Si;

O is oxygen;

$\alpha$, $\beta$, $\gamma$ are the relative molar ratios of each metal oxide and $\alpha=0–0.2$; $\beta=0–0.5$; $\gamma=0.5–1$; and x, y, z are the numbers determined by the valence requirements of the metals A, B, and C, respectively. Their value can be zero when the corresponding metal stays in the metallic states.

In this general formula, if component A is in metallic form, this general formula can be presented as $\alpha A$-$\beta BO_y$-$\gamma CO_z$. Alternatively, the catalyst can take a general formula as $\alpha AO_x$-$\gamma CO_z$ when component B is not used. The codes, A, C, O, $\alpha$, $\gamma$, x, z, etc. have the same meaning as described above. Furthermore, if component A is in metallic form, this general formula becomes to $\alpha A$-$\gamma CO_z$.

With these catalysts, oxygen can be removed from syngas, a Fischer-Tropsch feedstock or other gas stream containing CO and oxygen in the temperature range of 20 to 600° C., preferably 50 to 350° C., more preferably 50 to 300° C. The operative temperature range of the present invention is an advantage in that at least one embodiment allows the oxygen removal reactor to use the heat carried from the syngas reactor. This eliminates or at least greatly reduces the costs associated with any additional equipment or energy necessary to sustain the reaction.

In an alternative preferred embodiment, the concentration of oxygen is decreased in synthesis gas by flowing the synthesis gas along a membrane that is permeable to oxygen but not to synthesis gas. The synthesis gas is passed through an inner tube of selective membrane material. The inner tube is contained within a non-permeable outer tube such that an annulus is formed between the inner and outer tubes. A oxygen partial pressure differential is established between the inner tube and the annulus by either a pressure gradient or a concentration gradient across the membrane. This pressure differential between the inner tube and the annulus causes the oxygen to permeate through the inner tube toward the annulus.

Once separated from the synthesis gas, the oxygen can then be consumed in one of two reactions. The first is an oxidation reaction with hydrogen to form water according to reaction (5). The second is an oxidation reaction with carbon monoxide to form carbon dioxide according to reaction (4). In either reaction (4) or (5), the reaction can be driven by catalyst preferably dispersed on the outside surface of the inner tube. According to the present invention, metals that can be used to catalyze the hydrogen oxidation reaction include but are not limited to: Pt, Pd, Ni, Rh, Co, Fe, Au, Ag, Cu and Mn. The preferred metals are Pt, Pd, Rh, and Au. In addition, promoters such as rare earth metal oxides can be added to improve the catalytic activity of the catalyst. Other metal oxides can also be used as the active catalyst including: $Co_3O_4$, CuO, $MnO_2$, NiO, $Cr_2O_3$, $SnO_2$, $Fe_2O_3$, PbO and ZnO. The preferred oxides are $Co_3O_4$, CuO, $MnO_2$ and mixtures thereof. Also according to the present invention, the following metals (platinum group metals such as Pt, Pd, Ir, Rh and Ru) and metal oxides (such as NiO, $Cr_2O_3$, ZnO and $Fe_2O_3$) can be used to catalyze the carbon monoxide oxidation reaction. The more preferred catalysts are the metal and/or metal oxides with or without promoters that can catalyze both the hydrogen and carbon monoxide reactions, such as Pt, Pd, Rh, NiO, $Cr_2O_3$, ZnO and $Fe_2O_3$ In order to allow reaction (4) or (5) to occur, a gas that contains hydrogen or carbon monoxide, i.e., syngas, should be circulated through the annulus area to supply the reactant needed for the reaction with oxygen. Any unconverted oxygen passed directly into the annulus can also react on the catalyst on the outer surface of the inner tube. Thus, when the inner tube and annulus gas streams are combined into a final syngas stream the syngas should have an acceptable or non-toxic oxygen concentration, preferably less than 1000 ppm, more preferably less than 100 ppm, and more preferably less than 10 ppm.

According to this embodiment, oxygen can be removed from syngas, a Fischer-Tropsch feedstock or other gas stream containing CO and oxygen in the temperature range of 20 to 1000° C., preferably 50 to 600° C., and more preferably 50 to 300° C.

In still another specific preferred embodiment, a reduction in the concentration of oxygen in synthesis gas is achieved by flowing the synthesis gas over an adsorption matrix that will selectively react to adsorb oxygen but not synthesis gas. As with the other embodiments, the syngas reactor and process can be any known in the art, i.e., partial oxidation, steam reforming, etc., because the syngas reaction and processes are not critical to the present invention. In the most preferred embodiment, the synthesis gas is passed through a packed bed of the selective adsorbent material.

The adsorbent material is preferably prepared via incipient wetness impregnation on a support material followed by reduction to obtain the active oxide.

Metal and metal oxide adsorbents are identified for the selective adsorption of oxygen present in a gas stream such as a syngas product stream, a Fischer-Tropsch feedstock or other gas stream containing carbon monoxide. According to the present invention, the adsorbents to remove unconverted oxygen from these types of gas streams are preferably comprised of the transition metals and/or their oxides. In particular, the following metals are preferred: Sc, Ti, V, Cr, Mn, Fe, Co, Ni, Cu, Nb and Mo, more preferably Mn, Fe, Co, Ni and Cu, most preferably Mn and Co.

Depending on the type of reactor used, the oxygen-removal adsorbent can be produced in many different shapes, such as spheres, granules, cylinders, rings, extrudate, pellets etc. In the preferred embodiment, the catalyst size can range from 1/100 of an inch to 1 inch, preferably from 1/50 to ½ inch. Alternatively, the catalyst can be a monolith, foam, or honeycomb. In addition, the adsorbent support material can be any type of high surface area, porous and inert material. The preferred supports would include at least silica, alumina, zirconia, MgO, $TiO_2$, and the like. The most preferred support is silica.

The packed bed is contained within a non-permeable housing such that a column is formed. In the most preferred embodiment, the oxygen is removed from the synthesis gas by the following reaction:

$$MnO + \tfrac{1}{2}O_2 \rightarrow MnO_2 \qquad (7)$$

The overall process design preferably has more than one column with associated process equipment, such that when one column is completely saturated and no more oxygen adsorption can occur, the second column can brought on-line and the synthesis gas stream switched over. The oxygen can then be removed form the adsorbent in the first column, i.e., the saturated adsorbent bed can then be rejuvenated so that it can be used over and over again. The adsorbent is rejuvenated by the following reaction:

$$MnO_2 + H_2 \rightarrow MnO + H_2O \qquad (8)$$

According to present invention, oxygen can be removed from syngas, a Fischer-Tropsch feedstock or other gas stream containing CO and oxygen in the temperature range of 20 to 100° C. The reaction of equation (7) is an exothermic reaction and exhibits a heat of release in the range of about 100 to about 500 KJ per mole of $O_2$ depending on the adsorbent composition used. The total heat release per hour is obviously dependent on the feed flow and the oxygen concentration within the gas. The rejuvenation reaction of the adsorbent material is an exothermic reaction and operates in the temperature range of 100–700° C. Thus, according to the present invention, the temperature needed for the oxygen removal reaction can come directly from the heat carried with the syngas stream. This minimizes the need for any additional equipment and reduces capital costs. Appropriate insulation is enough to keep the reaction going to completion. However, heat may need to be provided for the rejuvenation reaction if the reactor is to be rejuvenated in the same location along the continuum between the syngas and Fischer-Tropsch reactors. The additional heat can be supplied from any means known in the art including passing a liquid or gas, i.e., water, steam or syngas, etc., over and around the outer surface of the adsorption columns. The preferred heating would be to use the heat from the syngas as it exits the syngas reactor. The syngas could then be treated as desired and passed through the oxygen removal reactor of the present invention.

Once the syngas stream has been exposed to the adsorbent bed, the oxygen is selectively removed from the syngas stream producing a non-toxic syngas stream. The produced non-toxic syngas can then be further treated or manipulated as needed and used as a Fischer-Tropsch or other downstream process feedstock. As with the other embodiments described herein, the Fischer-Tropsch reactor and process can be any technique known in the art, i.e., fixed or fluid beds, slurry bubble column(s), etc., because the Fischer-Tropsch reactions and processes are not critical to the present invention.

This invention further discloses a process comprising feeding a syngas stream with an oxygen concentration reduced to a non-toxic level to Fischer-Tropsch reactor, wherein the syngas stream is produced by partial oxidation of a hydrocarbon containing feed.

The oxygen removal reaction of the present invention does not have any significant side reactions such as methanation or carbon monoxide disproportionation. Thus, the hydrogen to carbon monoxide ratio, which may be valuable to subsequent synthesis reactions such as Fischer-Tropsch, is not significantly affected by the oxygen removal reactions.

These and other embodiments, features and advantages of the present invention will become apparent with reference to the following detailed description and drawings.

BRIEF DESCRIPTION OF THE DRAWINGS

For a more detailed understanding of the present invention, reference is made to the accompanying Figures, wherein:

FIG. 5 is a longitudinal cross-section of an oxygen removal reactor constructed in accordance with a preferred embodiment of the present invention;

FIG. 6 is a cross-section taken along lines 6—6 of FIG. 5;

FIG. 7 is a schematic cross-section of an alternate embodiment of the present invention, comprising of an oxygen removal reactor having multiple inner tubes within a single outer housing;

FIG. 8 is schematic cross-section of an second alternate embodiment of the present invention, comprising of an oxygen removal reactor having multiple inner tubes within a single outer housing;

FIG. 9 is a schematic cross-section of an third alternate embodiment of the present invention, comprising an oxygen removal chamber having multiple or removal reactors in parallel with a single housing.

DETAILED DESCRIPTION OF THE PREFERRED EMBODIMENTS

Figure 1:
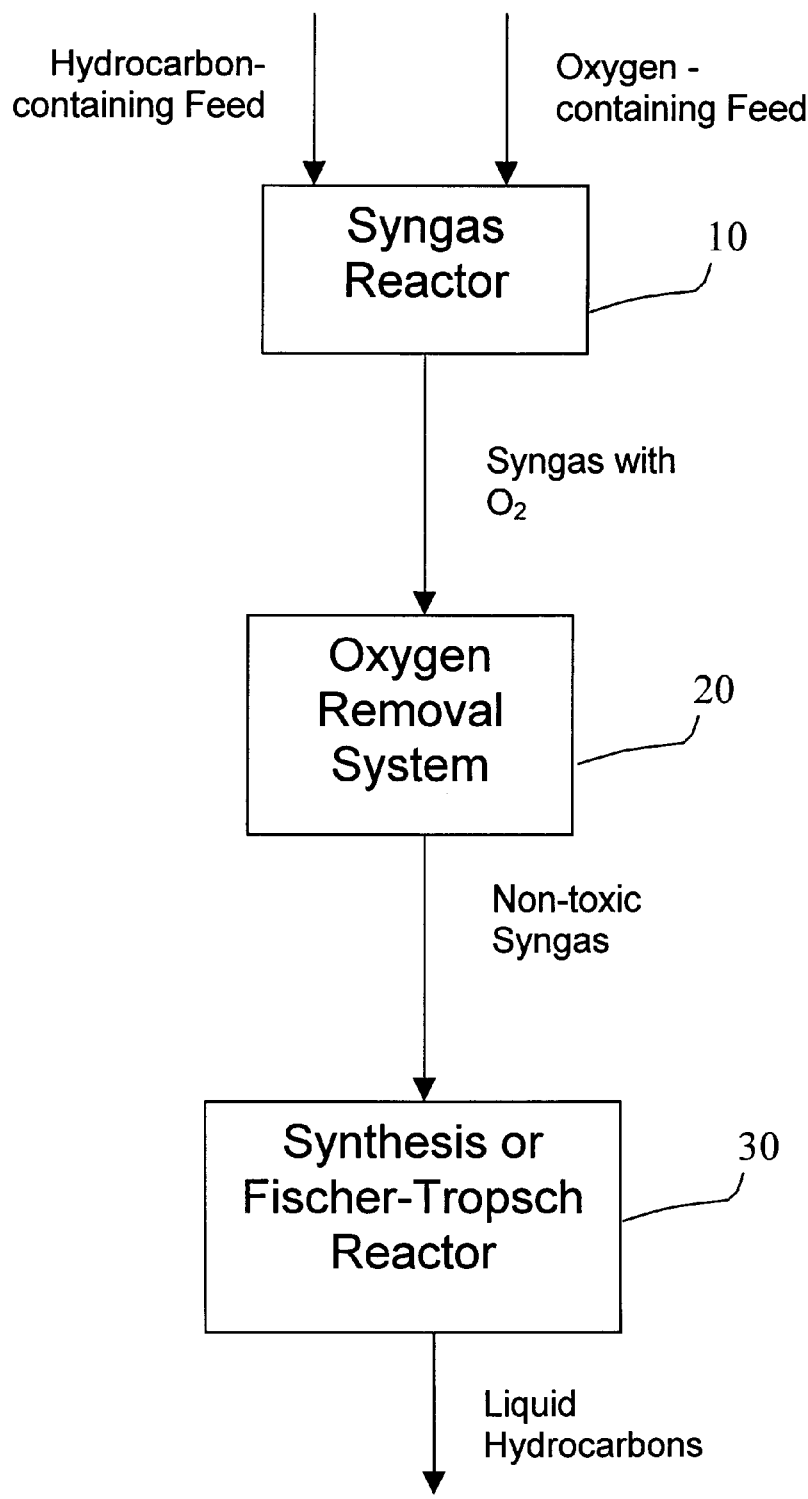
FIG. 1 is a natural gas to liquid hydrocarbon flow diagram.

There are shown in the drawings, and herein will be described in detail, specific embodiments of the present invention with the understanding that the present disclosure is to be considered an exemplification of the principles of the invention, and is not intended to limit the invention to that illustrated and described herein. References to upstream or downstream will be made for purposes of description, with upstream meaning the oxygen-containing syngas before being exposed to any oxygen removal reactor disclosed herein and downstream meaning the oxygen-reduced syngas after exposure to the oxygen removal reactor disclosed herein.

References made to "non-toxic levels" of oxygen do not necessarily require the removal of all oxygen from the syngas stream, although that is contemplated and may occur. As used herein, the term "non-toxic level" is intended to mean that the oxygen concentration has been reduced to a level that is acceptable for whatever application the syngas or other gas stream is to be used in downstream. For example in a typical Fischer-Tropsch reactor and catalyst, the preferred concentration of oxygen in the syngas or other feedstock would be less than 1000 ppm, more preferably less than 100 ppm, more preferably less than 10 ppm, and in some cases preferably less than 5 ppm. Thus, a non-toxic stream in accordance with the present invention to be used as a Fischer-Tropsch feedstock would reduce oxygen to a concentration of less than 1000 ppm, more preferably less than 100 ppm, and most preferably less than 10 ppm. Also, it should be appreciated that term "oxygen" is generally used herein and is intended to be interpreted as diatomic oxygen, i.e., oxygen that is capable of oxidizing the Fischer-Tropsch catalyst.

The present invention is directed towards an improved method for producing synthesis gas with non-toxic levels of poisons for downstream processes, such as hydrocarbon synthesis reactors. The invention comprises a process for producing synthesis gas comprising (a) reacting hydrocarbon-containing gas, such as methane or natural gas with oxygen, air or some other oxygen source in a syngas reactor to produce syngas; (b) decreasing the amount unconverted oxygen in at least a portion of the syngas stream of step (a) to produce a non-toxic stream of syngas.

In another embodiment the present invention comprises all of the steps described above and further comprises (c) reacting the non-toxic stream of syngas from step (b) in a synthesis reactor, i.e., Fischer-Tropsch or methanol reactor, to produce liquid hydrocarbons. One of the critical aspects of the invention is the related discovery that oxygen is a poison or deactivator for Fischer-Tropsch catalysts. Thus, in this preferred embodiment, the invention is an improved gas to liquid conversion process that eliminates or deters the deactivation of the hydrocarbon synthesis catalyst being used.

An alternative viewpoint for the present invention can be as an improvement for producing liquid hydrocarbons in a Fischer-Tropsch type process wherein the improvement lies in reducing the concentration of oxygen in the Fischer- Tropsch feedstock prior to the time the feedstock comes in contact with the Fischer-Tropsch catalyst. Thus, the present invention is simply an improved method for gas to liquid conversion of hydrocarbons, and many detailed embodiments for the removal of oxygen from hydrocarbon synthesis feedstocks i.e., syngas, are disclosed herein.

The oxygen removal process can be achieved by any means known in the art, however, the following techniques are considered to be the preferred embodiments of the present invention: selective catalytic reaction of oxygen and other gases, such as $CH_4$, CO or $H_2$, oxygen selective membranes (with and without catalyst coatings); an adsorption bed or column; pressure-swing adsorption through physisorption on molecular sieves; Fischer-Tropsch wax non-catalytic oxidation to produce oxygenates in F-T product stream; consuming the oxygen as a reactant in the functionalization of higher hydrocarbons, tail gas of a Fischer-Tropsch reactor containing olefins; liquid absorption with medium containing phenols, alcohols, and/or the like; using longer residence times after catalytic bed in vessel to combust oxygen (burn $O_2$) through homogeneous reactions; methane oxidation via a secondary bed or layer in CoPOX reactor on a modified catalytic partial oxidation catalyst with greater $O_2$ selectivity; any Redox reaction occurring in any adsorption bed, membrane, or the production of metal oxides; homogeneous catalysis for hydrogen peroxide ($H_2O_2$) production; cryogenic separation of $O_2$ from CO, $CH_4$ and $H_2$; biocatalytic reaction with cell-free enzymes such as but not limited to oxygenases, oxidoreductases, hydrogenases, or any combination thereof and in any form known in the art of biocatalysis such as but not limited to immobilized, encapsulated, solubilized, purified, extracted from cells, as well as with whole organisms; respiration of organisms; biosorption; and any combination thereof The following are examples of detailed descriptions for some of the above listed preferred embodiments according to the present invention. The examples should not be considered to be exhaustive or limiting in any way and are meant to illustrate the spirit of the invention.

EXAMPLE 1

Selective Catalytic Oxidation of Oxygen and Other Gases

Now referring to FIG. 1, a natural gas to liquid hydrocarbon flow diagram is shown to illustrate one general embodiment of the present invention. Hydrocarbon containing feed (such as methane, natural gas) and oxygen are used as reactants and passed through a syngas reactor 10 to produce a syngas product stream. Syngas is primarily hydrogen and carbon monoxide, however, unconverted oxygen, carbon dioxide, water and light hydrocarbons may also be present. In the preferred embodiment, the amount of unconverted oxygen is reduced from the syngas by passing it through an oxygen removal reactor 20 that promotes a reaction between carbon monoxide and oxygen. The oxygen concentration is thereby reduced to non-toxic levels. The syngas can then be used in a subsequent process such as a Fischer-Tropsch reactor 30. Alternatively, upstream of oxygen removal reactor 20, a recycling stream containing CO, hydrogen, light hydrocarbons etc. may be blended into the syngas stream, depending on the process design.

According to the preferred embodiments of present invention when using the selective catalytic oxidation technique, the oxygen removal reactor 20 reactor can be operated between 20° C. and 600° C., preferably between 50° C. and 350° C., depending on the catalyst selected and the oxygen content in the feed syngas. The production of syngas typically involves high temperatures due to the exothermic nature of the reaction, such as in the catalytic partial oxidation or auto-thermal reforming processes, or through an external heater, as needed in a steam reforming process. Syngas is at a temperature of about 600–1500° C. when leaving a syngas reactor. The syngas must be transitioned to be useable in a Fischer-Tropsch or other synthesis reactors, which operate at lower temperatures of 200° C. to 400° C. The syngas is typically cooled, dehydrated (i.e., taken below 100° C. to knock out water) and compressed during the transition phase. In this transition of syngas from the syngas reactor 10 to the Fischer-Tropsch reactor 30, the syngas temperature may go through a temperature window of 50° C. to 1500° C. Therefore, the present oxygen-removal reactor 20 can be selectively placed within the transitional phase continuum where the temperature is appropriate.

Since the oxygen concentration in syngas is below 1%, mostly less than 0.5%, the moderate heat release of reaction (4) will have a negligible effect on the overall oxygen-removal reactor temperature. According to the present invention, the temperature needed for the oxygen removal reaction can come directly from the heat carried with the syngas stream. This minimizes the need for any additional equipment and reduce capital costs. Appropriate insulation is enough to keep the reaction going to completion. Although the preferred embodiment is to use the existing heat of the syngas stream, this is not critical to the present invention and any alternative method of heating known in the art can be used. For example, the desired temperature can be generated through the use of a heat exchanger upstream of the oxygen-removal reactor 20, or by heating reactor 20 using steam or hot water.

Depending on the type of reactor used, the oxygen-removal catalyst can be produced in many different shapes, such as spheres, granules, cylinders, rings, extrudate, pellets etc. In the preferred embodiment, the catalyst size can range from 1/100 of an inch to inch, preferably from 1/50 to ½ inch. Alternatively, the catalyst can be a monolith, foam, or honeycomb by selecting the corresponding type of support materials such as alumina, magnesia, etc. Such catalyst forming techniques and configurations are well described in the literature, for example, in *Structured Catalysts and Reactors*, A. Cyulski and J. A. Moulijn (Eds.), Marcel Dekker, Inc., 1998, p. 599–615 (Ch. 21, X. Xu and J. A. Moulijn, "Transformation of a Structured Carrier into Structured Catalyst").

When a structured catalyst is used, due to the low-pressure drop along the catalyst bed, oxygen removal reactor 20 can comprise, for example, one or more 1–10 inch pipes. The pipe(s) can be used to connect the syngas reactor to the FT synthesis reactor for hydrocarbon synthesis or to methanol/alcohols reactors. This type of flow setup does not necessitate the addition of significant new instrumentation to the plant and thus does not require significant capital outlay. It should be appreciated that the present invention is not limited to structured catalysts, nor is it critical to the invention to incorporate structured catalysts into the oxygen removal reactor. Any of the known types of catalyst configurations are sufficient for the removal of oxygen from syngas, Fischer-Tropsch feedstock or CO containing gas streams in accordance with the present invention.

The preferred catalysts of the present invention are very active and selective. Therefore, the contact time for this reaction can vary over a wide range so that the gas hourly space velocity (the standard volume of gas flow through per volume of catalyst per hour) can vary between 1000 hr$^{-1}$ and 10,000,000 hr$^{-1}$. In addition, the oxygen removal reactor can be operated in a wide pressure range, such as from atmospheric pressure to 1000 psi, or even higher.

The preferred embodiment of the present invention comprises using novel, highly active and selective metal oxide supported metal/metal oxide catalysts to remove unconverted oxygen from syngas. The catalysts should comprise a (i) catalytic metal, preferably comprising a precious or transition metal, (ii) a support material, preferably comprising a Group II, III or IV element, and optionally (iii) a promoter, preferably comprising a rare earth metal. In the most preferred embodiment, these catalysts have the general formula $\alpha AO_x$-$\beta BO_y$-$\gamma CO_z$, wherein:

A is one of the precious metals Rh, Ru, Pd, Pt, Au, Ag, Os or Ir or is a transition metal chosen from the group consisting of Sc, Ti, V, Cr, Mn, Fe, Co, Ni, Cu, Zn, Nb, Mo, Tc, Hf, Ta, W, Re, preferably Fe, Co, Ni, Mn, V or Mo or any combination of the above;

B is a rare earth metal La, Ce, Pr, Nd, Pm, Sm, Eu, Gd, Tb, Dy, Ho, Er, Tm, Yb, Lu, Sc, Y and Th, preferably La, Yb, Sm or Ce;

C is an element chosen from Group II (i.e., Be, Mg, Ca, Sr, Ba and Ra), III (i.e., B, Al, Ga, In, Tl) and IV (i.e., C, Si, Ge, Sn, Pb) elements of the Periodic Table of the Elements, preferably Mg, Al or Si;

O is oxygen;

$\alpha$, $\beta$, $\gamma$ are the relative molar ratios of each metal oxide and $\alpha=0$–$0.2$; $\beta=0$–$0.5$; $\gamma=0.5$–$1$; and x, y, z are the numbers determined by the valence requirements of the metals A, B, and C, respectively. Their value can be zero when the corresponding metal stays in the metallic states.

In this general formula, if component A is in metallic form, this general formula can be presented as $\alpha A$-$\beta BO_y$-$\gamma CO_z$. Alternatively, the catalyst can take a general formula as $\alpha AO_x$-$\gamma CO_z$ when component B is not used. The codes, A, C, O, $\alpha$, $\gamma$, x, z, etc. have the same meaning as described above. Furthermore, if component A is in metallic form, this general formula becomes to $\alpha A$-$\gamma CO_z$.

According to the present invention, a syngas feed stream comprising hydrogen, carbon monoxide, and oxygen (may also contain carbon dioxides, water, light hydrocarbon) is contacted with one of the above-described metal-metal oxide catalysts. These catalysts are active for catalyzing the selected, efficient conversion of oxygen to carbon dioxide by promoting a reaction with carbon monoxide. Many different reactors such as convenient fixed bed reactor, fluidized bed reactor can be used for this reaction. The reactor can be constructed in many different geometry such as tubular, cubic etc.

General Procedure for Catalyst Preparation

The preferred catalysts of the present invention can be prepared through any impregnation and co-precipitation techniques known in the art. Impregnation techniques are more preferred, especially when noble metals such as Pt and/or Au are being used.

When the catalysts are prepared by impregnation, first, a support material must be selected. The support material should have a high surface area and a wide variety of pore structures. Although many support materials are suitable, the preferred support material would be selected from the group comprising alumina, silica, titania, magnesia, zirconia, silicon carbide, active carbon and mixture thereof. After selecting a support material, a liquid solution containing the active metal components is impregnated onto the support using either incipient wetness or by soaking the support in excess solution. The solid material is then dried starting at room temperature and then ramped up to around 120° C. The resulting catalyst material is then calcined at 200 to 800° C. to decompose the precursor compound(s) into their corresponding metal oxides.

When multi-components are used, such as expressed in the formula of $\alpha AO_x$-$\beta BO_y$-$\gamma CO_z$, stepwise or co-impregnation can be used. Stepwise impregnation is done by impregnating one component, as described above, followed by the impregnation of the next component. Calcination in between the impregnation of each component is optional depending on the exact metals used. Alternatively, a co-impregnation method can be used in preparing multi-components catalysts. In this method, a mixed solution containing all desired metal elements is impregnated onto the catalyst support material in one step followed by drying and calcination.

Some of the preferred catalysts will be active after calcination. However, most catalysts may need to be reduced after calcination to achieve an active catalyst. The calcined catalysts are usually reduced in a gas mixture containing hydrogen in the temperature range of 200–700° C. to convert the active component from oxide to its metallic state. The following examples are representative of catalysts in accordance with one embodiment of the preferred present invention.

Catalyst Sample 1. Pt/Alumina

A Pt(1 wt. %)/alumina catalyst was prepared by impregnation method. Aldrich alumina was selected as the catalyst support. The alumina had a particle size of ca. 150 mesh and surface area of 155 square meters per gram. Hydrogen hexachloroplatinate (IV) ($H_2PtCl_6$) (Aldrich), 8 wt. % solution in water was used as platinum precursor. 2.625 g $H_2PtCl_6$ solution was diluted to 5 ml with de-ionized water and the solution was impregnated onto 10 g $Al_2O_3$ by incipient wetness. The sample was dried at room temperature for 12 hours and calcined at 650° C. for 5 hours in flowing air at 50 ml/min. The resulting catalyst material contained 1 wt % of platinum supported on alumina.

Catalyst Sample 2. Pt/Ce/Alumina

A Pt(1 wt. %) $CeO_2$(15 wt. %)/alumina was prepared through the stepwise impregnation method. Aldrich alumina was selected as the catalyst support. The alumina had a particle size of ca 150 mesh and surface area of 155 square meters per gram. Hydrogen hexachloroplatinate (IV) ($H_2PtCl_6$)(Aldrich), 8 wt. % solution in water was used as platinum precursor. $Ce(NO_3)_3.6H_2O$ (Aldrich) was used as a precursor for $CeO_2$. First, 4.4896 g $Ce(NO_3)_3.6H_2O$ was dissolved into 5 ml de-ionized water and the solution was impregnated on 10 g of alumina to incipient wetness. The sample was then dried at 120° C. for 2 hours and calcined at 400° C. for two hours. The material was then impregnated with 5 ml of a platinum solution containing 0.250 g $H_2PtCl_6$. The impregnated sample was then dried at 120° C. for 12 hours and calcined at 650° C. for 5 hours in flowing air at 50 ml/mn. The resulting catalyst material contained 1 wt. % Pt and 15 wt. % $CeO_2$ on an alumina support.

Test Procedure

The representative catalysts prepared as described in the above Catalyst Sample preparation descriptions were evaluated for their ability to catalyze the selective removal of oxygen from syngas through oxidation reaction between CO and oxygen to carbon dioxide in a fixed bed flow reactor. The catalyst was loaded at the tip of a quartz tube (ca ¼" O.D.) with a metal cap. This tube was installed in a ½" I.D. stainless tube. A syngas stream containing oxygen was passed through the quartz tube. Helium was purged through the space between the stainless steel and quartz tube. The reactor was heated using an electric heater around the stainless steel reactor wall. Two Type K thermocouples were used to measure the stainless steel wall temperature and the gas temperature immediately below the catalyst bed. A gas mixture containing $H_2$/CO/He/oxygen was made by blending hydrogen (grade 5), CO (high purity) and 1 vol/% oxygen/helium mixture. Typically, this gas mixture contains 50 vol. % hydrogen, 35 vol. % carbon monoxide, ca 14.85 vol. % helium, and 1500 ppm oxygen. The effluent gas from this reactor was analyzed with Thermal Star quadruple mass spectrometer (MS). In MS measurement, fragment ions with mass number m/e (m/e is defined as the ratio of the mass of a fragment ion versus its charge) of 15, 18, 28, 32, and 44 were used to monitor the concentrations of methane, water, carbon monoxide, oxygen and carbon dioxide. Typically, 0.2 g of catalyst was loaded for each reaction test. After the catalyst was loaded in the reactor, the gas flow was adjusted to the desired composition. When the flow became stable, the MS was turned on to monitor the change of product composition. This MS measurement was continued throughout the heating up of the reactor from 25° C. to 300° C. at 5° C./min.

In one embodiment, illustrated in FIG. 4 and discussed in detail below, in order to simulate commercial conditions, the premixed syngas was passed through a water saturator kept at 25° C. As a result, the feed gas contained about 2–3 wt. % water, which is typical in the syngas commercially produced through CPOX and/or other processes.

Figure 2:
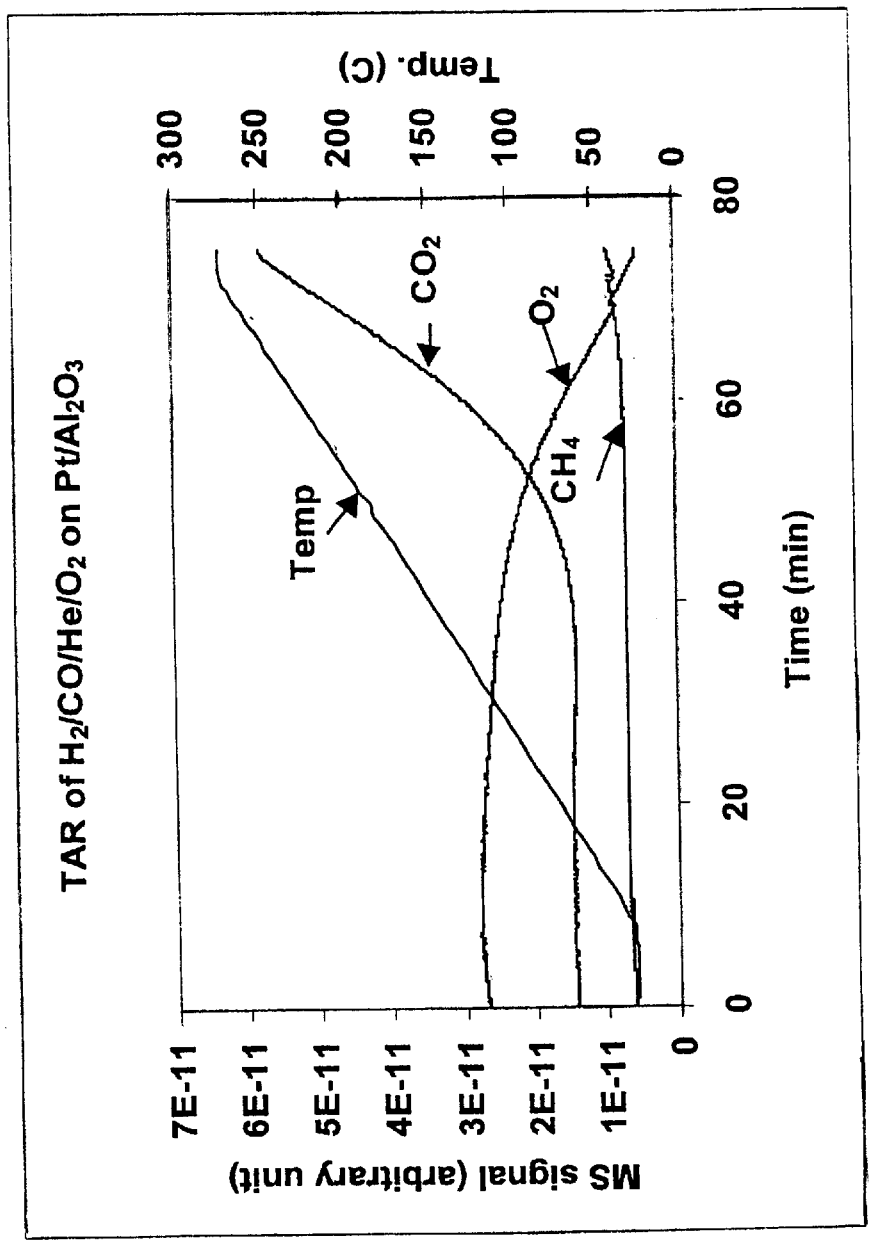
FIG. 2 is a graph plotting the units of methane, oxygen and carbon dioxide for a syngas stream exiting an oxygen removal reactor in accordance with the present invention using a 1 wt % Pt on alumina catalyst.

Now referring to FIG. 2, a graph plotting the relative abundance of methane, oxygen and carbon dioxide exiting the oxygen removal reactor is shown for a syngas stream exiting an oxygen removal reactor constructed in accordance with the present invention and using a 1 wt % Pt on alumina catalyst (as prepared in Example 1). FIG. 2 shows that when the catalyst was heated, the concentration of oxygen began to decrease at approximately 120° C. and continued to decrease with increasing temperature. The decreasing oxygen concentration appears to level off at a temperature above 270° C. This indicates the point at which essentially all of the oxygen feed in the syngas mixture was converted. At the same temperature range, carbon dioxide was formed, as is indicated by the MS results. It should be appreciated that no significant change occurred in the signal corresponding to methane concentration. Therefore, no significant amount of methane was formed through any methanation side reactions. Also, an analysis of the water content in the resulting gas stream indicated that no additional water had been formed.

According to reaction (4), converting each mole of oxygen needs two moles of carbon monoxide and produces two moles of carbon dioxide. A typical syngas stream to be used as a feedstock for a Fischer-Tropsch process should contain ca 55–75% hydrogen and 25–40% CO, balanced with water, methane and some carbon dioxide. The unconverted oxygen content is typically less than 0.5 vol %. Removal of 0.5 vol % oxygen from the syngas stream consumes only about 1 vol. % of carbon monoxide and increases the carbon dioxide concentration by only 1 vol %. Thus, the oxygen removal reaction has a negligible affect on the overall hydrogen to CO ratio. Also, the additional carbon dioxide has no known detrimental affect on the subsequent Fischer-Tropsch process.

Figure 3:
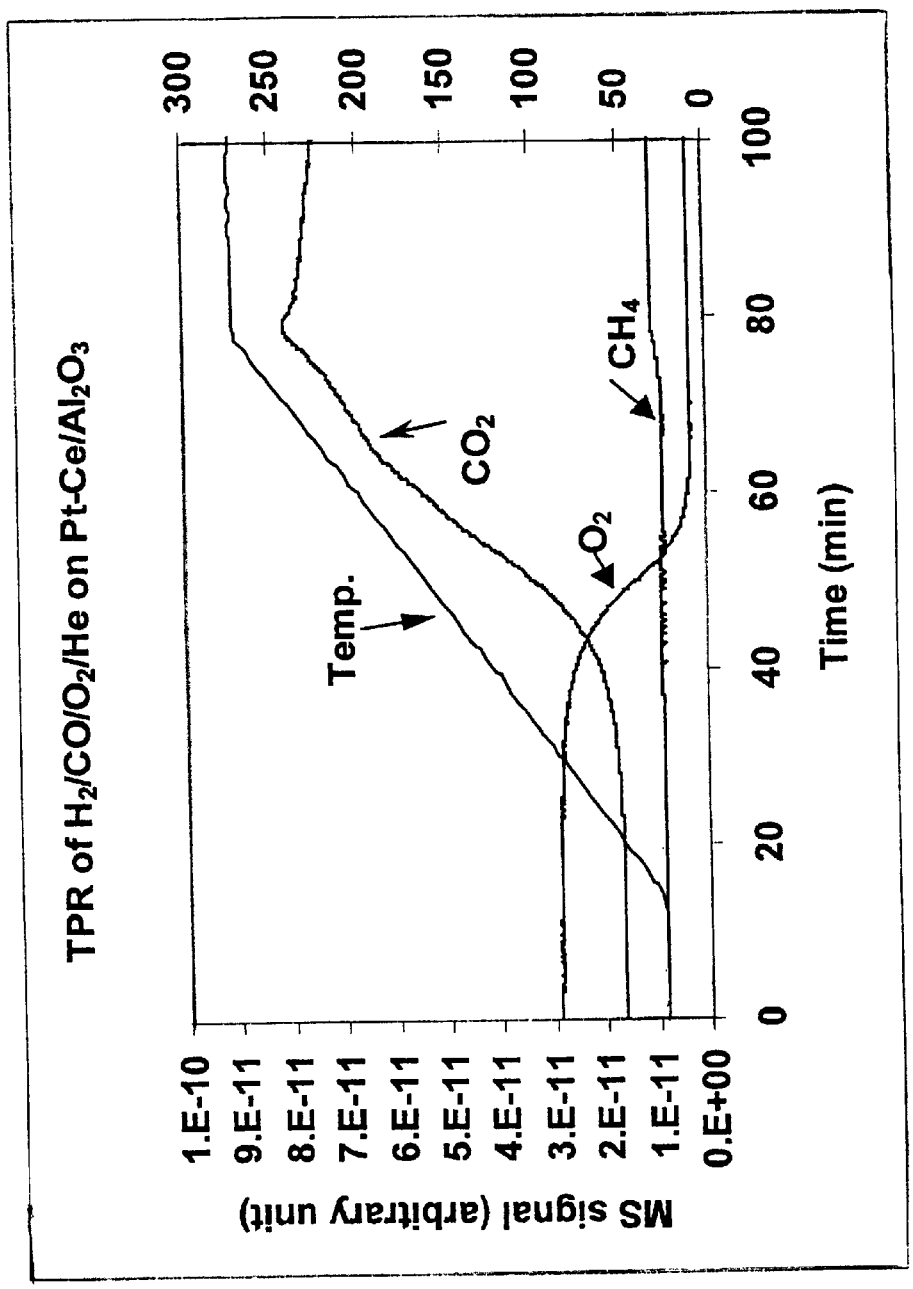
FIG. 3 is a graph plotting the units of methane, oxygen and carbon dioxide for a syngas stream exiting an oxygen removal reactor in accordance with the present invention and using a 1 wt % Pt and 15 wt % $CeO_2$ on alumina catalyst.

Now referring to FIG. 3, a graph plotting the relative abundance of methane, oxygen and carbon dioxide is shown for a syngas stream exiting an oxygen removal reactor in accordance with the present invention and using a 1 wt % Pt and 15 wt % $CeO_2$ on alumina catalyst (as prepared in Example 2). On this catalyst, the oxidation reaction starts at lower temperature, i.e., around 100° C., and levels off at around 200° C. This phenomenon can be attributed to the higher activity of the Pt—Ce/alumina catalyst.

Figure 4:
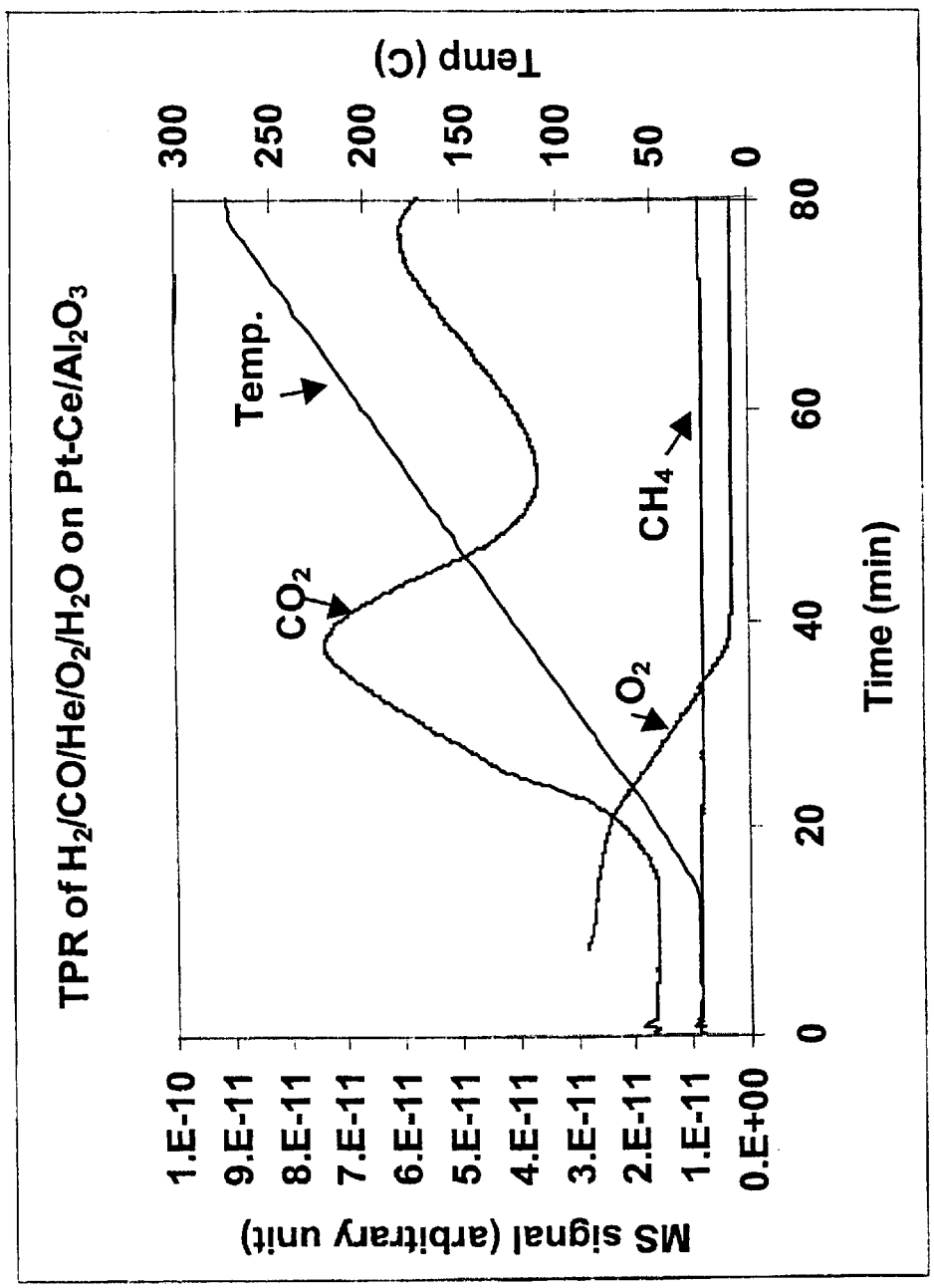
FIG. 4 is a graph plotting the units of methane, oxygen and carbon dioxide for a syngas stream exiting an oxygen removal reactor in accordance with the present invention and using a 1 wt % Pt and 15 wt % $CeO_2$ on alumina catalyst.

FIG. 4 shows a graph plotting the relative abundance of methane, oxygen and carbon dioxide for a syngas stream exiting an oxygen removal reactor in accordance with the present invention and using a 1 wt % Pt and 15 wt % $CeO_2$ on alumina catalyst (as prepared in Example 2). The difference between the reaction data shown in FIGS. 3 and 4 is that the reaction of FIG. 4 included water in the feedstock mixture. When water was added in the feedstock stream, the oxidation reaction started at an even lower temperature. The consumption of oxygen and the production of carbon dioxide started immediately when the catalyst was heated to slightly above room temperature. As in FIGS. 2 and 3, the leveling off of the oxygen plot in FIG. 4 indicates that oxygen conversion reaches a steady state of conversion at around 130° C.

The catalysts of the present invention have not shown any signs of deactivation and can be repeatedly or continuously used for oxygen removal. The only poison for these catalysts known to date is sulfur, which is typically removed prior to the oxygen removal reactor. Therefore, it appears that the oxygen removal catalysts can operate for long periods of time without requiring regeneration. This is a significant feature of the present invention in that it reduces the costs associated with replacing or regenerating catalyst material.

EXAMPLE 2

Oxygen Selective Membrane with Catalyst Coating

Referring again to FIG. 1, in another preferred embodiment of the present invention, the amount of unconverted oxygen in the syngas exiting the syngas reactor 10 is lowered by passing the oxygen containing syngas stream through an oxygen removal reactor 20 that reduces oxygen levels via a structured reactor with an oxygen selective membrane and catalyst coating.

According to this preferred embodiment of the present invention, the oxygen removal reactor 20 reactor can be operated between 20° C. and 1000° C., preferably between 50° C. and 800° C., depending on the catalyst selected and the oxygen content in the feed syngas. As previously described in Example 1, during the transition of syngas from the syngas reactor 10 to the Fischer-Tropsch reactor 30, the syngas may go through a temperature window of 50° C. to 1500° C. Therefore, an oxygen-removal reactor 20 in accordance with Example 2 can be selectively placed within the transitional phase continuum where the temperature is appropriate. Accordingly, the temperature needed for the oxygen removal reaction can come directly from the heat carried with the syngas stream, but also could come from any alternative method of heating known in the art can be used.

One preferred embodiment of the oxygen removal reactor 20 referred to in FIG. 1 is comprised of at least one membrane de-oxygenizer 100 as shown in its most preferred embodiment in FIG. 5. The membrane de-oxygenizer 100 is comprised of an inner flow bore 110, an inner tubular member 120, an annulus 130, and an outer tubular member 140. The inner tubular member 120 is preferably comprised of a support material 150, a membrane material 160, and a catalyst material 170. During operation, an oxygen-containing gas, such as syngas, Fischer-Tropsch feedstock, or other CO and/or $H_2$ containing gas, flows axially through the inner flow bore 110. Gas also flows axially through annulus 130. The partial pressure of oxygen within the flow bore 110 is preferably higher than the partial pressure of oxygen within the annulus area 130 either by feed or by catalytic consumption that results in their lower partial pressure on one side. The gas in the annulus can be a premixed gas or simply the same gas as that flowing through inner flow bore 110, i.e., syngas. The difference in partial pressures will cause oxygen to transfer radially outward from inner flow bore 110 through inner tubular member 120 toward annulus 130. As the oxygen contacts the catalyst material 170, a reaction is initiated between oxygen and hydrogen in the annulus, producing water. (Equation 4). Alternatively, the catalyst material 170 can initiate a reaction between oxygen and carbon monoxide in the annulus, producing carbon dioxide. (Equation 5). Hydrogen may be preferably supplied as part of the gas flowing through the annulus 130.

Referring now to FIG. 6, outer member 140 can have any closed geometric form. Likewise, inner tube 120 can have any closed geometric form. In considering the preferred geometric form, it should be appreciated that as much gas as possible should be exposed to selective membrane 160 so that as much oxygen as possible can contact the catalyst material 170. Thus, it is preferred that inner tube 120 be either circular or rectangular. In more preferred embodiments, outer member 140 and inner tube 120 will have corresponding concentric geometric forms, as shown in FIG. 6. It will be appreciated that the shapes of tube 120 and member 140 are not critical to operation of the invention.

The outer member 140 is an inert material that may be the outer housing of the reactor or may be further enclosed in a space separate outer housing (not shown). The types of materials useful in manufacturing such a housing are well known by those skilled in the art. The considerations being that the housing should be inert to the flowing gas streams, capable of withstanding pressures and temperatures associated with the upstream output gas streams, and capable of withstanding the pressures and temperatures associated with the de-oxygenation reactions of the present invention. With the above considerations in mind, various configurations are possible. FIGS. 7, 8 and 9 are the cross sectional views of some alternative preferred embodiments for the syngas de-oxygenation reactors in accordance with the present invention.

Referring now to FIG. 7, an alternative embodiment for a de-oxygenation reactor 200 constructed in accordance with one embodiment of the present invention comprises an outer member 205 and a plurality of inner cylindrical tubes 210. Outer member 205 corresponds to the outer member 140 of FIG. 6. Likewise, inner tubes 210 preferably correspond to inner tube 120 of FIG. 6 in composition and design. Inner tubes 210 are preferably arranged so that the volume within the inner tubes 210 is greater than the volume in the interstitial space 215.

FIG. 8 shows another alternative embodiment for a de-oxygenation reactor 225, which comprises an outer member 230 and multiple inner rectangular tubes 235. It should be appreciated that the only difference between FIGS. 7 and 8 is the geometric form assumed by the inner tubes. Cylindrical and rectangular are the preferred shapes but, as stated before, the shape is not critical to operation of the invention. Therefore, the number of inner tubes and their arrangement is not critical, as long as adequate exposure of the gas to the oxygen selective membrane is obtained.

FIG. 9 is yet another alternative embodiment in accordance with the present invention, which comprises an outer casing 255, outer tubes 260, and inner tubes 265. Each pair of outer tubes 260 and inner tubes 265 has an annular space 270. Each outer tube 260 and its corresponding inner tube 265 can be collectively viewed as individual de-oxygenation channels 275. Channels 275 correspond in composition and design to de-oxygenation reactor 100 as described with respect to FIG. 6. A gas or liquid may be independently passed adjacent to the de-oxygenation channels 275 through the interstitial spaces 280, which can help control the temperature of the de-oxygenation reaction. This is an ancillary benefit to this design and is not critical to the present invention.

Referring again to FIGS. 5 and 6, one preferred embodiment of inner tube 120 has a three component structure that includes support material 150, selective membrane material 160 and catalyst material 170. Support 150 can be prepared from any material as long as it meets the following criteria. First, the material must be inert to the syngas product stream. Second, it must be porous or have a sufficient amount of void space so that the oxygen in the syngas stream can permeate through the selective membrane material 160 and reach or become exposed to the catalyst material 170. Some examples of preferred support material are $Al_2O_3$, $SiO_2$, porous ceramics, stabilized zirconia composites, etc. Alternatively, rigid mesh may be used as long as the mesh size can support the dense membrane material and retain enough void space so that the gas is not impeded. Third, the support 150 must be able to withstand the pressures and temperatures of the reactor environment. The temperature range will preferably be from 20° C. to 1000° C., preferably between 50° C. and 600° C. Depending on the material used, the pressure consideration can be resolved as a function of the radial thickness. The preferred thickness range will depend on the material selected and operational parameters. Finally, the membrane material 160 must be able to maintain its integrity during thermal expansion and contraction. In the preferred embodiment the integrity of the membrane can be maintained by using a support material 150 and membrane material 160 with identical or substantially identical thermal expansion coefficients.

Still referring to FIGS. 5 and 6, as the gas passes through flow bore 110, it will permeate support material 150. In doing so, the gas stream is exposed to the selective membrane layer material (SML) 160. SML 160 is preferably non-porous, so that it forms a gas-tight seal between the flow bore 110 and annulus 130. However, it should be appreciated that a gas-tight seal at the ends of each tube and throughout the membrane material may be impossible and is not critical. Small leaks will not significantly affect the present invention, since the gas in the flow bore 110 and annulus 130 are preferably the same gas.

According to a preferred embodiment of the present invention, SML 160 is preferably comprised of an electronically and ionically conductive material that is oxygen selective. As oxygen is exposed to SML 160 it is transferred through the material toward to the catalyst material 170. It is necessary to have an oxygen gradient across the SML 160. This can be easily accomplished by maintaining a higher partial pressure of oxygen gas in flow bore 110 than in annulus 130. The same composition of gas may be passed through at different rates to achieve the difference in partial pressures. It is the pressure differential that drives the oxygen to permeate through the SML 160. As oxygen is exposed to the SML 160 on the oxygen rich side, the oxygen is absorbed onto the surface and ionized. Oxygen ions are then transported through the SML 160 toward catalyst material 170, where the partial pressure of oxygen is lower.

It is well known that the selectivity of permeation processes can be almost 100%. Thus, other gas components remain in flow bore 110. The syngas passed through the annulus may also contain some oxygen, which would be consumed as part of the catalytic oxidation reactions shown as reactions (4) and (5). Thus, the oxygen from both the flow bore 110 and annulus 130 streams will be removed from the syngas final product before entering the Fischer-Tropsch reactor.

There are several well-known compositions of oxygen selective membrane material, including but not limited to: perovskite membranes, doped-zirconia perovskite-like materials, and other dual phase metal-metal oxide combinations. The preferred membrane materials for use in the present invention are perovskite and perovskite-like membranes. These type of materials are taught in the following references: U. Balachandran, J. T. Dusek, R. L. Mieville et al., *Appll. Catal. A: Gen.*, 133 (1995) 19; Jonghee Ham Yongxian Zeng, Y. S. Lin, *J. Memrane Science*, 132 (1997) 235; H. J. M. Bouwmeester, H. Kruishof, A. J. Burggraaf, P. J. Gellings, *Solid State Ionic*, 5356 (1993) 460; S. Liu, G. Xiong, S. Sheng et al., *Study of Surface Science & Catalyst*, 119 (1998) 747–752; Guoxing Xiong, Hui Dong, Zongping Shao, Jianhua Tong, Shishan Sheng, Weishen Yang, *International Conference on Catalytic Membrane Reactors*-2000, 25–26; Chung-Yi Tsai, Anthony G. Dixon, Yi Hua Ma, et al.; *J. Am. Ceram. Soc.* 81[6] (1998) 1437; L. M. van der Haar, and H. Verweij, *J. Memrane Science*, 180 (2000) 147, which are incorporated herein by reference. A particularly preferred membrane composition for the present invention is $SrCo_{0.8}Fe_{0.2}O_{3-\delta}$. This composition is preferred due to its low activation energy and high flux capacity.

The catalytic oxidation reactions between oxygen and hydrogen and/or carbon monoxide according to the present invention are thermodynamically favored. The catalyst material 170 should be very active but also selective. By selective, it is meant that it is preferred that the methanation of CO be avoided. According to the present invention, the following metals, Pt, Pd, Ni, Rh, Co, Fe, Au, Ag, Cu, Mn can be used to catalyze the hydrogen oxidation reaction. The preferred metals are Pt, Pd, Rh, and Au. In addition, promoters such as rare earth metal oxides can be added to improve the catalytic activity of the catalyst. Other metal oxides can also be used as the active catalyst including: $Co_3O_4$, CuO, $MnO_2$, NiO, $Cr_2O_3$, $SnO_2$, $Fe_2O_3$, PbO and ZnO. The preferred oxides are $Co_3O_4$, CuO, $MnO_2$ and mixtures thereof. Also according to the present invention, the following metals (platinum group metals such as Pt, Pd, Ir, Rh and Ru) and metal oxides (such as NiO, $Cr_2O_3$, ZnO and $Fe_2O_3$) can be used to catalyze the carbon monoxide oxidation reaction. The more preferred catalysts are the metal and/or metal oxides with or without promoters that can catalyze both the hydrogen and carbon monoxide reactions, such as Pt, Pd, Rh, NiO, $Cr_2O_3$, ZnO and $Fe_2O_3$.

The most preferred catalysts are Pt based catalysts ranging from pure Pt to mixtures of Pt with basic promoters. The preferred promoters should be extremely oxidative, such as $CeO_2$ and $SnO_2$. Promoters can also be helpful in preventing the methanation side reactions. It is preferred that the catalyst material 170 be uniformly dispersed on the outer surface of inner tube 120. The Pt loading is preferably from 0.5–1.0%. The promoter can be up to 5.0%. The catalyst loading can be prepared by any known techniques including impregnation, sputtering, etc.

Figure 10:
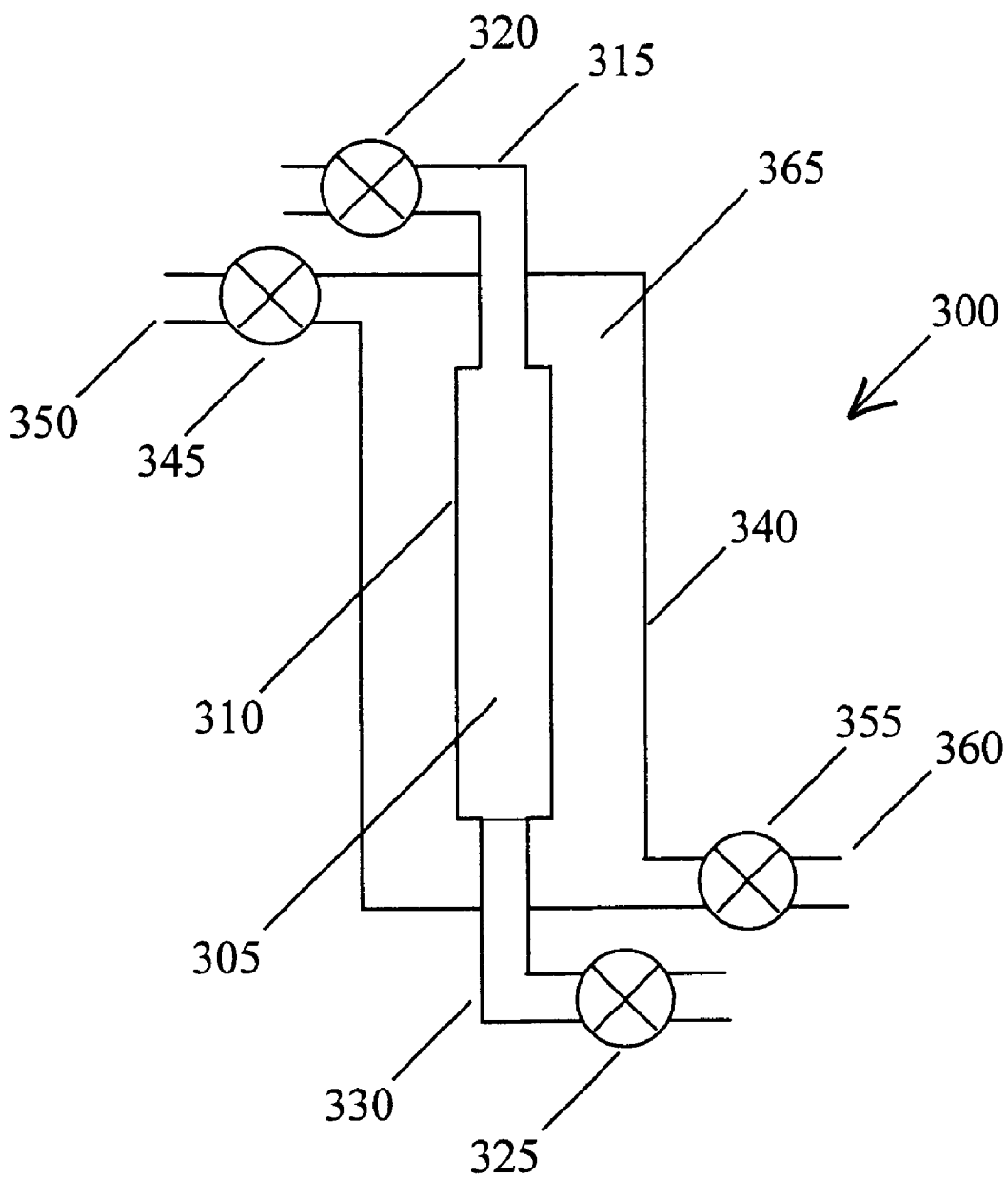
FIG. 10 is a schematic diagram of an oxygen removal reactor.

FIG. 10 shows a de-oxygenation reactor 300 in a schematic diagram illustrating the control of flow through the reactor 300. The de-oxygenation reactor 300 comprises an inner tube 310 and outer tube 340. Inner tube 310 is similar in composition and design to inner tube 120 of FIGS. 5 and 6. Likewise, outer tube 340 corresponds to outer tube 140 of FIGS. 5 and 6. Syngas from a syngas reactor or holding container is passed through line 315 and valve 320 into inner tube 310. Similarly, syngas is passed into annulus 365 via line 350 and valve 345. The gases exit inner tube 310 and annulus 365 through valves 325 and 355 and lines 330 and 360, respectively. Valves 320, 325, 345 and 355 allow control of the flow rate and pressure of syngas or other oxygen containing gas through the flow bore 305 and annulus 365. By controlling the flow rates and pressure within flow bore 305 and annulus 365, a partial pressure differential of oxygen can be achieved between flow bore 305 and annulus 365. It should be appreciated that FIG. 10 shows only one inner tube for simplicity of illustration, but that multiple tubes are preferred.

As the gases exit through lines 330 and 360, the oxygen level should be at or below the desired concentration, i.e., less than 1000 ppm, preferably less than 100 ppm, still more preferably less than 10 ppm. Both gas streams can be combined at some desired stage downstream of the de-oxygenation reactor 300.

The following tables contain calculations based on a hypothetical commercial plant processing 1.5 billion cubic feet of syngas per day. The tables present the number of tubes calculated to be necessary to remove oxygen at the indicated operating conditions, assuming a diameter of 5 cm and length of 5 m. All other variable information is based on published information for the specified membrane compositions.

TABLE 1

Based on a membrane composition of $Ba_{0.5}Sr_{0.5}Co_{0.8}Fe_{0.2}O_{3-\delta}$

| Mole fraction of oxygen | Syngas flow rate (mol/s) | Oxygen flow rate, mole/s | Membrane thickness, mm | Temp, K | Flux, mole/(cm² s) | Required surface area (m²) | Surface Area of 5 cm tube, (m²) | Number of tubes required |
|---|---|---|---|---|---|---|---|---|
| 0.0001 | 20000 | 2 | 1.8 | 490 | 7.49E−07 | 266.92 | 0.25 | 1068 |
| 0.001 | 20000 | 20 | 1.8 | 490 | 7.49E−07 | 2669.21 | 0.25 | 10677 |
| 0.001 | 20000 | 20 | 0.01 | 490 | 1.35E−04 | 14.83 | 0.25 | 59 |
| 0.001 | 20000 | 20 | 0.01 | 700 | 5.37E−04 | 3.72 | 0.25 | 15 |
| 0.001 | 40000 | 40 | 0.01 | 700 | 5.37E−04 | 7.45 | 0.25 | 30 |
| 0.001 | 20000 | 20 | 0.01 | 900 | 1.10E−03 | 1.82 | 0.25 | 7 |
| 0.001 | 20000 | 20 | 0.01 | 1000 | 1.41E−03 | 1.42 | 0.25 | 6 |
| 0.001 | 20000 | 20 | 0.01 | 1100 | 1.73E−03 | 1.15 | 0.25 | 5 |
| 0.001 | 40000 | 40 | 0.01 | 1100 | 1.73E−03 | 2.31 | 0.25 | 9 |
| 0.001 | 30000 | 30 | 0.01 | 1200 | 2.06E−03 | 1.46 | 0.25 | 6 |

TABLE 2

Based on a membrane composition of $SrCo_{0.8}Fe_{0.2}O_{3-\delta}$

| Mole percent of oxygen | Syngas flow rate (mol/s) | Oxygen flow rate, mole/s | Membrane thickness, mm | Temp, K | Flux mole/(cm² s) | Required surface area (m²) | Surface Area of 5 cm tube, (m²) | Number of tubes required |
|---|---|---|---|---|---|---|---|---|
| 0.0001 | 20000 | 2  | 1.8  | 490  | 6.32E−07 | 316.39  | 0.25 | 1266  |
| 0.001  | 20000 | 20 | 1.8  | 490  | 6.32E−07 | 3163.89 | 0.25 | 12656 |
| 0.001  | 20000 | 20 | 0.01 | 490  | 1.14E−04 | 17.58   | 0.25 | 70    |
| 0.001  | 20000 | 20 | 0.01 | 700  | 5.43E−04 | 3.68    | 0.25 | 15    |
| 0.001  | 40000 | 40 | 0.01 | 700  | 5.43E−04 | 7.36    | 0.25 | 29    |
| 0.001  | 20000 | 20 | 0.01 | 900  | 1.22E−03 | 1.64    | 0.25 | 7     |
| 0.001  | 20000 | 20 | 0.01 | 1000 | 1.62E−03 | 1.23    | 0.25 | 5     |
| 0.001  | 20000 | 20 | 0.01 | 1100 | 2.05E−03 | 0.98    | 0.25 | 4     |
| 0.001  | 40000 | 40 | 0.01 | 1100 | 2.05E−03 | 1.95    | 0.25 | 8     |
| 0.001  | 30000 | 30 | 0.01 | 1200 | 2.49E−03 | 1.21    | 0.25 | 5     |

EXAMPLE 3

Adsorption of Oxygen from Syngas

Referring again to FIG. 1, in another preferred embodiment, the amount of unconverted oxygen in the syngas is reduced by passing the syngas stream through an oxygen removal reactor 20 that reduces oxygen levels using adsorption or chemisorption techniques. The oxygen concentration is thereby reduced to non-toxic levels. The syngas can then be used in a subsequent process such as a Fischer-Tropsch reactor 30. It should be appreciated that variations may be made to this basic process flow diagram. For example, upstream of oxygen removal reactor 20, a recycling stream containing CO, hydrogen, light hydrocarbons etc. may be blended into the syngas stream.

Syngas reactor 10 can comprise any of the synthesis gas technology and/or methods known in the art. The hydrocarbon-containing feed is almost exclusively obtained as natural gas. However, the most important component is generally methane. Methane or other suitable hydrocarbon feedstocks (hydrocarbons with four carbons or less) are also readily available from a variety of other sources such as higher chain hydrocarbon liquids, coal, coke, hydrocarbon gases, etc., all of which are clearly known in the art. Similarly, the oxygen-containing gas may come from a variety of sources and will be somewhat dependent upon the nature of the reaction being used. For example, a partial oxidation reaction requires diatomic oxygen as a feedstock while steam reforming requires only steam. Regardless of the sources, the hydrocarbon-containing feed and the oxygen-containing feed are reacted under catalytic conditions. The catalyst compositions useful for synthesis gas reactions are well known in the art. They generally are comprised of a catalytic metal that has been reduced to its active form and one or more promoters on a support structure. The most common catalytic metals are cobalt, nickel and iron. The support structures often times dictate the type of catalyst bed that must be used. For example, fixed beds are comprised of monoliths and large particle sized supports. Small particle sized supports tend to be more useful in fluidized beds. The synthesis gas feedstocks are generally preheated, mixed and passed over or through the catalyst beds. As the mixed feedstocks contact the catalyst the synthesis reactions take place. The synthesis gas product contains primarily hydrogen and carbon monoxide, however, many other minor components may be present including steam, nitrogen, carbon dioxide, ammonia, hydrogen cyanide, etc., as well as unreacted feedstock, such as methane and/or oxygen. Still referring to FIG. 1, the synthesis gas product, i.e., syngas, is then passed from the syngas reactor 10 to the oxygen removal reactor 20. It should be appreciated that the syngas may undergo various treatments prior to introduction into the oxygen removal reactor 20, as will be more apparent from the following discussion.

According to the preferred embodiments of present invention, the oxygen removal reactor 20 can be operated from about 20° C. to about 100° C. The temperature selected will ultimately depend on the adsorbent composition selected and the oxygen content in the syngas. Some of the adsorbent compositions identified herein may require higher operating temperatures up through 400° C. As stated previously, syngas typically experiences a temperature window of 50° C. to 1500° C. Therefore, the present oxygen-removal reactor 20 can be selectively placed within the transitional phase continuum where the temperature is appropriate. Also, the temperature needed for the oxygen removal reaction can come directly from the heat carried with the syngas stream or from any alternative method of heating known in the art can be used. Again, minimizing the need for any additional equipment and reducing capital costs.

Figure 11:
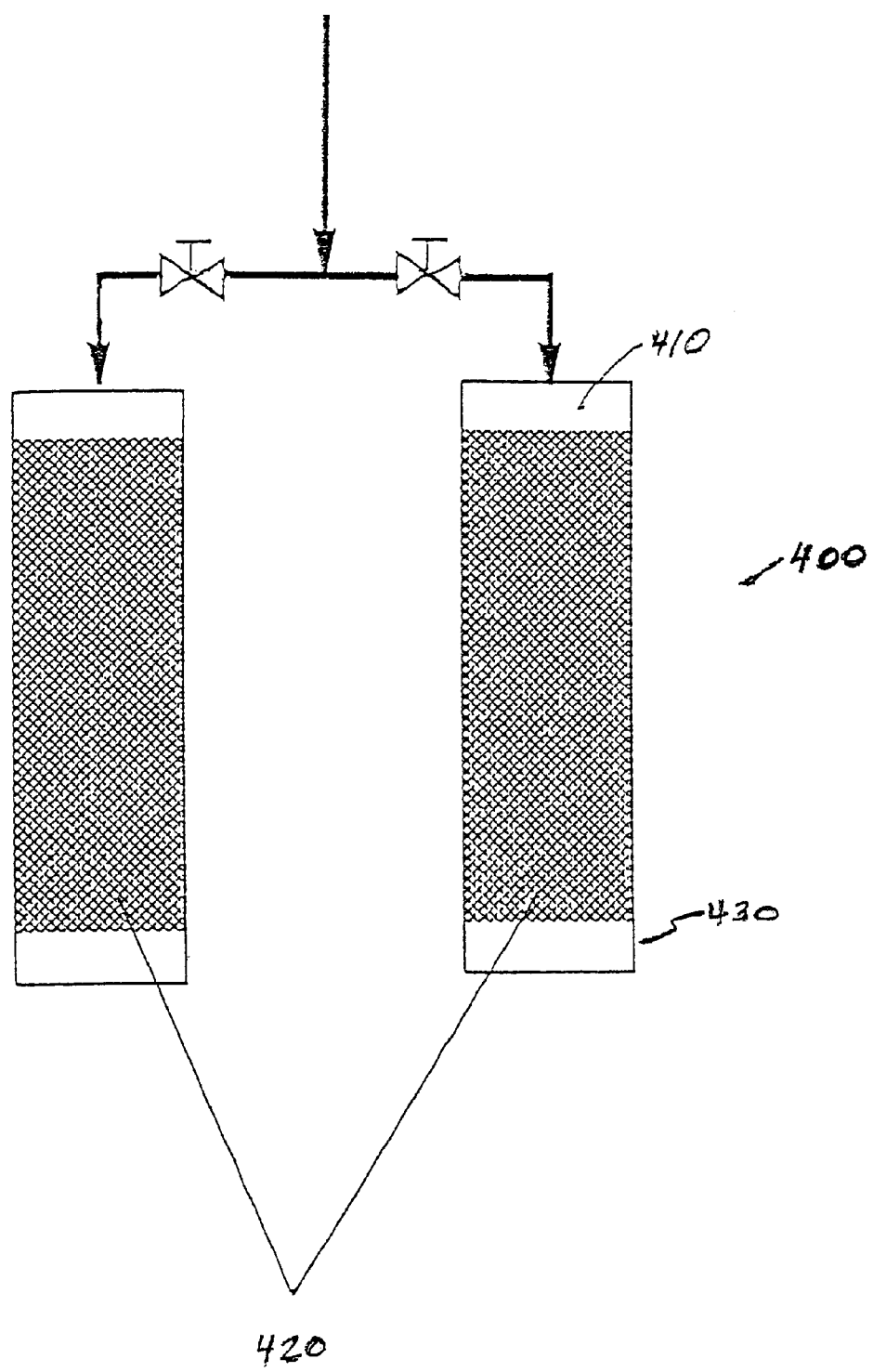
FIG. 11 is a longitudinal cross-section of an oxygen removal reactor constructed in accordance with a preferred embodiment of the present invention.

One preferred embodiment according to Example 3 of oxygen removal reactor 20 shown in FIG. 1 comprises at least one adsorption column 400, and is shown in its most preferred embodiment in FIG. 11. The adsorption column 400 comprises an inner flow bore 410, an adsorbent bed 420, and an outer housing 430. The diameter and length of the inner flow bore 410 can be selected as necessary to achieve a sufficient volume of adsorbent material for a given flow rate and concentration. One of the advantages of the present invention is that the saturation of the adsorbent is predictable. This allows the columns to be designed with a particular operation period in mind. In other words, for a given flow rate and concentration of gas, the volume of an adsorption column 400 can be designed to be on-line for a day, week, month, etc., before reaching capacity. During operation, an oxygen-containing gas, such as syngas, Fischer-Tropsch feedstock, or other CO and/or $H_2$ containing gas, flows axially through the inner flow bore 410 and through the adsorbent bed 420.

As the syngas flows through the inner flow bore 410, the oxygen in the syngas will contact the adsorbent bed 420. The adsorbent bed 420 is preferably comprised of a packed bed of supported adsorbent material. However, the type of reactor used can vary widely. The adsorbent can be produced in many different shapes, such as spheres, granules, cylinders, rings, extrudate, pellets etc. In the preferred embodiment, the adsorbent size can range from 1/100 of an inch to inch, preferably from 1/50 to 1/2 inch. Alternatively, the catalyst can be a monolith, foam, or honeycomb.

The preferred embodiment of the present invention comprises using highly active and selective metal oxide supported adsorbents to remove unconverted oxygen from syngas. The preferred adsorbent compositions for the present invention are metal and metal oxide adsorbents useful for the selective adsorption of oxygen present in a gas stream such as a syngas product stream, a Fischer-Tropsch feedstock or other gas stream containing carbon monoxide. According to the present invention, the adsorbents useful for removal of unconverted oxygen from these types of gas streams is preferably comprised of the transition metals and/or their oxides. In particular, the following metals are preferred Sc, Ti, V, Cr, Mn, Fe, Co, Ni, Cu, Nb, Mo and mixtures thereof, more preferably Mn, Fe, Co, Ni, Cu and mixtures thereof, most preferably Mn, Co and mixtures thereof.

The preferred adsorbents of the present invention can be prepared through any impregnation, co-precipitation, or other preparation techniques known in the art. Impregnation techniques are more preferred. The adsorbent material is similar to a "catalyst" in terms of function and how it should be prepared. For this reason, the techniques involved in coating the support as well as forming the support material are consistent with the catalyst technologies known in the art. Such catalyst impregnation and forming techniques, as well as support configurations, are well described in the literature. As stated previously, a good description of such techniques can be read in *Structured Catalysts and Reactors*, A. Cyulski and J. A. Moulijn (Eds.), Marcel Dekker, Inc., 1998, p. 599–615 (Ch. 21, X. Xu and J. A. Moulijn, "Transformation of a Structured Carrier into Structured Catalyst").

When the catalysts are prepared by impregnation, first, a support material must be selected. The support material should have a high surface area and a wide variety of pore structures. Although many support materials are suitable, the preferred support material would be selected from the group comprising alumina, silica, titania, magnesia, zirconia, silicon carbide, active carbon and mixture thereof. After selecting a support material, a liquid solution containing the active metal components is impregnated onto the support using either incipient wetness or by soaking the support in excess solution. The solid material is then dried starting at room temperature at around 120° C. The resulting catalyst material is then calcined at 200 to 800° C. to decompose the precursor compound(s) into their corresponding metal oxides. Although some metal oxides may then be in an active form, the material is then reduced in hydrogen at an elevated temperature to obtain the active form of the adsorbent, as shown above in equation (7). The process is well known in the art.

When multi-components are used, a stepwise or co-impregnation can be used. Stepwise impregnation is done by impregnating one component, as described above, followed by the impregnation of the next component. Calcination in between the impregnation of each component is optional depending on the exact metals used. Alternatively, a co-impregnation method can be used in preparing multi-components catalysts. In this method, a mixed solution containing all desired metal elements is impregnated onto the catalyst support material in one step followed by drying and calcination.

Outer housing 430 can have any closed geometric form. The outer housing 430 is preferably an inert material. The types of materials useful in manufacturing such a housing are well known by those skilled in the art. The considerations being that the housing should be inert to the flowing gas streams, capable of withstanding pressures and temperatures associated with the upstream output gas streams, and capable of withstanding the pressures and temperatures associated with the de-oxygenation reactions of the present invention. With the above considerations in mind, various configurations are possible. In addition, the outer housing 430 that may be the outer housing of the reactor or may be further enclosed in a space separate outer housing (not shown). The use of a second outer housing will form an interstitial or annulus space between the outer housing 430 of the adsorption column and the space separate outer housing of the reactor. A gas or liquid may be independently passed adjacent to the outside surface of the outer housing 430 through the interstitial or annulus space, which can help control the temperature of the adsorption reaction. This is an ancillary benefit to this design and is not critical to the present invention.

Referring back to FIG. 1, as the gases exit the oxygen removal reactor 20, the oxygen level should be at or below the desired concentration, i.e., less than 1000 ppm, preferably less than 100 ppm, still more preferably less than 10 ppm. This "non-toxic" syngas can then be introduced to Fischer-Tropsch reactor 30, assuming the correct temperature and pressure.

The Fischer-Tropsch reactor 30 can comprise any of the Fischer-Tropsch technology and/or methods known in the art. The Fischer-Tropsch feedstock is hydrogen and carbon monoxide, i.e., syngas. The hydrogen to carbon monoxide molar ratio is generally deliberately adjusted to a desired ratio of approximately 2:1, but can vary between 0.5 and 4. The syngas is then contacted with a Fischer-Tropsch catalyst. Fischer-Tropsch catalysts are well known in the art and generally comprise a catalytically active metal, a promoter and a support structure. The most common catalytic metals are Group VIII metals, such as cobalt, nickel, ruthenium, and iron or mixtures thereof The support is generally alumina, titania, zirconia or mixtures thereof. Fischer-Tropsch reactors use fixed and fluid type conventional catalyst beds as well as slurry bubble columns. The literature is replete with particular embodiments of Fischer-Tropsch reactors and Fischer-Tropsch catalyst compositions. As the mixed feedstocks contact the catalyst the hydrocarbon synthesis reactions take place. The Fischer-Tropsch product contains a wide distribution of hydrocarbon products from $C_5$ to greater than $C_{100}$.

The following examples are representative of adsorbents prepared in accordance with one embodiment of the preferred present invention.

Adsorbent Preparation

An adsorbent with formula of 30 wt. % $MnO_2$ on silica was prepared through incipient wetness impregnation. Aldrich® $Mn(NO_3)_2 \cdot xH_2O$ was used as the precursor for manganese oxide, and Davisil™ grade 635 silica gel (35–60 mesh) was used as the supporting material. 12.4 g of $Mn(NO_3)_2 \cdot xH_2O$ was dissolved into 20 ml de-ionized water and impregnated onto 14 g of silica gel to incipient wetness. The obtained material was then dried at 120° C. for 6 hours, and calcined at 450° C. for 4 hours in flow air. A temperature programmed reduction (TPR) of the above obtained adsorbent was carried out in a gas mixture containing 3 mol. % hydrogen in helium. A total amount of 0.13 g sample was used for the reduction experiment. The total gas flow was 200 ml/min. The reactor temperature was ramped from 50° C. to 700° C. at 5° C./min. The gas product was analyzed with an online mass spectrometer for water production. The TPR results indicated that when the catalyst was heated to above 450° C. in gas mixture containing hydrogen, water is produced in the product stream, indicating that the catalyst start to be reduced at around 450° C. in hydrogen through the reaction shown in equation (7).

Testing

Figure 12:
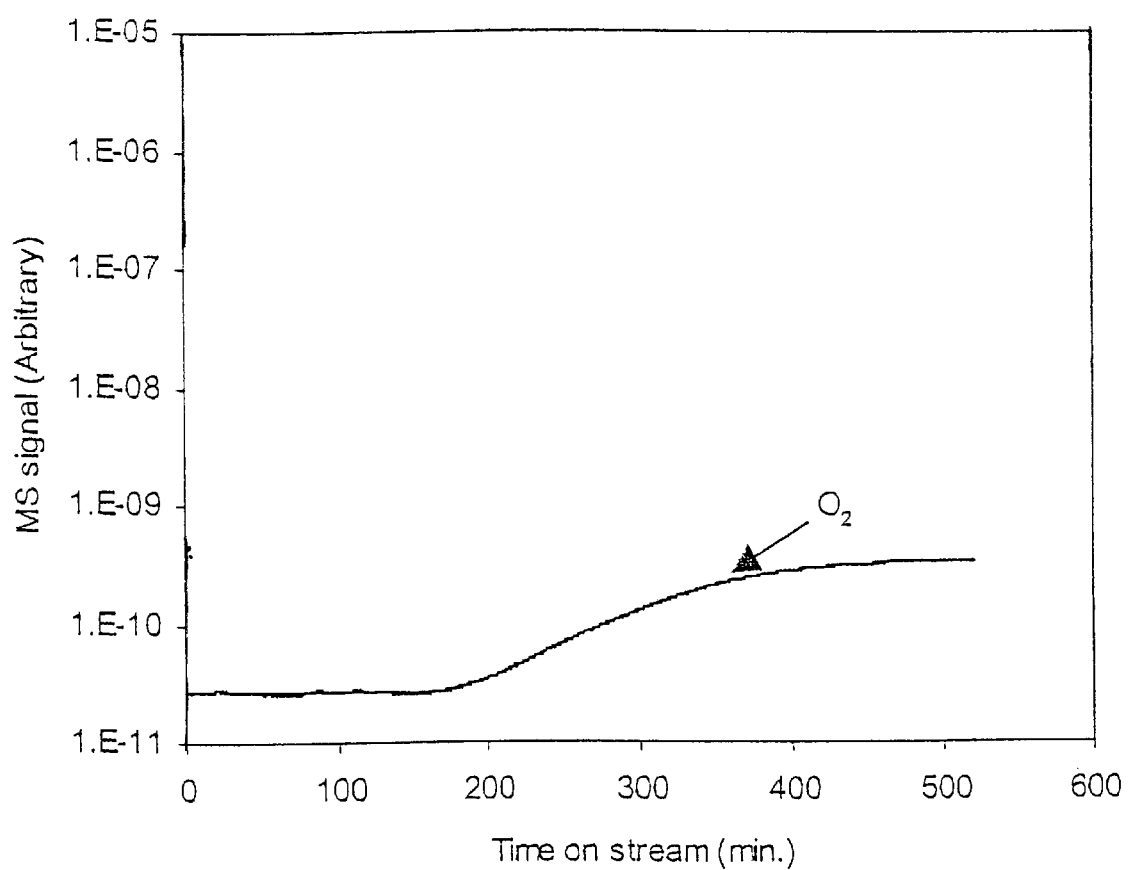
FIG. 12 is plot of the transient response of a mass spectrometric measurement of effluent gas from an adsorbent reactor in accordance with the present invention.

Around 0.1 to 0.2 grams of $MnO_2/SiO_2$ adsorbent was loaded in a fixed bed reactor. The adsorbent was first reduced in gas mixture 15 vol. % hydrogen in helium at 100 ml/min at 650° C. for 1 hour, then cooled down to 50° C. in the same gas stream. When the reactor is cooled down, a gas mixture of CO/H2/He/O2 (containing 30 vol. % CO; 55 vol % H2; 14.85% helium and 1500 ppm oxygen) was switched in for oxygen adsorption. The effluent gas was monitored with an online mass spectrometer and a trace oxygen analyzer to measure the oxygen break through. FIG. 12 clearly shows that when the switch was made from a H2/He feed gas to a gas containing 1500 ppm of O2 at around 50° C. the oxygen concentration remained stable for another ~120 minutes. After which, the oxygen concentration begins to grow and level off at approximately 400 minutes. This clearly indicates that the oxygen was being adsorbed and effectively removed from the feed gas stream until the adsorbent began to saturation. After saturation, the adsorbent no longer removed oxygen from the feed gas stream. The saturated adsorbent was then reduced using a gas mixture containing 15 vol % hydrogen in helium at 450° C. and ready for use again as an oxygen selective adsorbent.

The following examples are meant to further illustrate the spirit of the invention. Each of the following examples will describe a preferred embodiment for the oxygen removal reactor 20 as shown in FIG. 1. It should be appreciated that the syngas referred to in these examples is meant to be the syngas exiting the syngas reactor 10. It should also be appreciated that these embodiments will result in syngas exiting the oxygen removal reactor 20, which has an oxygen level at or below the desired concentration, i.e., less than 1000 ppm, preferably less than 100 ppm, still more preferably less than 10 ppm. This "non-toxic" syngas can then be introduced to Fischer-Tropsch reactor 30, assuming the correct temperature and pressure wherein the syngas is converted to liquid hydrocarbons via Fischer-Tropsch reactor 30 as described previously in accordance with the present invention.

EXAMPLE 4

Pressure-Swing Adsorption

In another embodiment of the present invention, the oxygen removal reactor 20 comprises a pressure swing adsorption reactor. Pressure swing adsorption ("PSA") techniques are known in the art and can easily be adapted to remove oxygen from a syngas stream by using the appropriate PSA adsorbent. The design of the reactor and particular composition of the catalyst is not critical to the present invention and an excellent general description of how a PSA system works can be found in U.S. Pat. No. 5,730,003 which is hereby incorporated by reference. Suitable oxygen selective adsorbents are known in the art and any will suffice. Some of the preferred adsorbents are carbon molecular sieves, clinoptilolite, and type A zeolite. The syngas can then exit the oxygen removal reactor 20.

EXAMPLE 5

Oxidation of Fischer-Tropsch Waxes

In this embodiment, the oxygen will be removed via the oxidation of hydrocarbonaceous material. According to this preferred embodiment, the syngas containing oxygen is passed over a hydrocarbonaceous material, preferably comprising Fischer-Tropsch wax material, wherein a reaction between the oxygen and the hydrocarbon material takes place. The other gases present in the syngas are not significantly reactive and, thus, only the oxygen is removed from the syngas stream. Oxygenates are formed between the oxygen and hydrocarbon material. The reaction can be carried out with or without a catalyst present. Suitable catalysts can be copper-based or iron-based as described in U.S. Pat. No. 5,453,211, which is hereby incorporated by reference. The presence of a catalyst enhances the production of oxygenates and, thus, the consumption of the oxygen in the syngas stream. The syngas can then exit the oxygen removal reactor 20.

EXAMPLE 6

Absorption of Oxygen Using Liquid Medium

In this preferred embodiment, the oxygen removal reactor 20 comprises a tower or chamber containing a liquid absorbent and the oxygen is removed via absorption by the liquid medium. Suitable absorbents having an oxygen affinity are known in the art and may include, but are not limited to, liquids containing aldehydes or ascorbic acid as described in U.S. Pat. Nos. 4,827,043 and 5,128,060, respectively, both of which are hereby incorporated by reference. The syngas can then exit the oxygen removal reactor 20.

EXAMPLE 7

Oxygen Combustion

As stated previously, the syngas product stream produced by catalytic partial oxidation of natural gas, typically comprises up to 5% by volume oxygen as well as other gases such as hydrogen, carbon monoxide and light hydrocarbons. The exiting temperature of the syngas is in the range of 600–1500° C. In this gas stream, hydrogen, CO and the light hydrocarbons are all combustible gases and can react with oxygen as shown in reaction equations (4), (5) and (6).

The equilibrium concentration of oxygen in the syngas stream can be calculated by minimizing the Gibbs energy of the system. For example, the thermodynamic equilibrium concentration of oxygen at a pressure of about 200 psig and a temperature range from 700 to 2300 K. These calculations can be accomplished using software known by those skilled in the art, such as the software package developed by Dr. Olaf Deutschman. Within these operating conditions, the thermodynamic equilibrium concentrations of oxygen is less than 1 ppb, which is below the concentration considered harmful to the Fischer-Tropsch catalyst.

The equilibrium oxygen concentration can also be roughly estimated at the thermodynamic equilibrium of reaction equation (5). Table 3 shows two sample cases with different syngas compositions. The calculations were carried out using two pressures for each case to show the pressure effect. In both of the typical cases, the equilibrium oxygen concentration is less than 10 ppb.

TABLE 3

Equilibrium oxygen concentration (molar fraction)

| Temp. (K) | Case #1 | | Case #2 | |
| --- | --- | --- | --- | --- |
| | P = 125 psi | P = 400 psi | P = 125 psi | P = 400 psi |
| 900 | 8.1-E−16 | 2.6E−16 | 1.2E−14 | 3.85E−15 |
| 1000 | 2.2E−14 | 7.0E−15 | 3.3E−13 | 1.05E−13 |
| 1100 | 3.4E−13 | 1.1E−13 | 5.0E−12 | 1.59E−12 |
| 1500 | 4.8E−10 | 1.5E−10 | 7.3E−09 | 2.29E−09 |

Case #1: the syngas is composed (by mole) of 64% $H_2$, 32% CO, 3% $H_2O$ and 1% $CH_4$.
Case #2: the syngas is composed (by mole) of 55% $H_2$, 34% CO, 10% $H_2O$ and 1% $CH_4$ According to Table 3, by allowing enough residence time at high temperature, the oxygen concentration in the syngas stream will approach the equilibrium value. This can be done by increasing the residence time at the reactor exit in a large chamber. Increasing the residence time will allow oxygen to be converted through combustion of hydrogen, CO and/or hydrocarbons to a level low enough to be non-toxic to the downstream process.

EXAMPLE 8

Oxidation

Oxygen can also be removed by involving the oxygen in further oxidation reactions, including a secondary catalytic partial oxidation reaction. The reactions can take place in additional catalyst beds and/or extensions of the syngas reactor catalyst bed in syngas reactor 10. Any reduced metal catalyst, e.g., Pt, Rh, Co, Ni, etc., can be located at or near the end of the syngas reactor 10 catalyst bed, which would include extending the existing catalyst bed or adding on an additional bed. The syngas can then exit the oxygen removal reactor 20.

EXAMPLE 9

Removal Via Biotechnology

Referring again to FIG. 1, in another preferred embodiment of the present invention, the amount of unconverted oxygen in the syngas exiting the syngas reactor 10 is lowered by passing the oxygen containing syngas stream through an oxygen removal reactor 20 that reduces oxygen levels using biological removal mechanisms, e.g., aerobic organisms or enzymatic biocatalysis. For example, removal of oxygen via biological means can be achieved by aerobic organisms via respiration, metabolic or co-metabolic oxidation, enzymatic biodegradation and/or any combination thereof. Any organism, preferably microorganisms, or enzymes that can use oxygen to convert available organic material in the presence of oxygen, would be suitable for this preferred embodiment. The reactor can be designed as a biofilter, bioscrubber or a biotrickling filter or a bio-reactor as is appropriate. The following references generally describe these processes: U.S. Pat. Nos. 3,996,105, 4,269,940, 4,318,784, 4,587,216, 5,192,672, 5,714,379, 5,958,757, 5,985,649 and 6,019,810, all of which are hereby incorporated by reference.

As the gases exit the oxygen removal reactor 20, the oxygen level should be at or below the desired concentration, i.e., less than 1000 ppm, preferably less than 100 ppm, still more preferably less than 10 ppm. This "non-toxic" syngas can then be introduced to Fischer-Tropsch reactor 30, assuming the correct temperature and pressure wherein the syngas is converted to liquid hydrocarbons via Fischer-Tropsch reactor 30 as described previously (see Example 3) in accordance with the present invention.

Apparatus

There are numerous variations that may comprise the actual apparatus for carrying out the embodiments of the present invention. The following is a description of an apparatus in accordance for the preferred embodiments. An apparatus for carrying out the processes of the present invention should preferably comprise (a) a syngas reactor having a gaseous hydrocarbon inlet, an oxygen inlet, a syngas product outlet and a solid catalyst within the syngas reactor arranged such that the oxygen and gaseous hydrocarbon enter the reactor through their respective inlets, contact the solid catalyst to form syngas and the produced syngas exits the syngas reactor via the syngas product outlet; (b) an oxygen reduction vessel having a syngas inlet, an oxygen depletion zone and a refined product outlet wherein the syngas inlet is connected to the syngas product outlet to receive at least a portion of the syngas from the syngas reactor and convey the syngas into the oxygen depletion zone where it forms syngas having a reduced oxygen content and the reduced oxygen content syngas exits the oxygen reduction vessel via said refined product outlet; and (c) a synthesis reactor having a reactant gas inlet, solid catalyst and a hydrocarbon product discharge port wherein the reactant gas inlet is connected to the refined product outlet of the oxygen reduction vessel to receive at least a portion of the reduced oxygen content syngas wherein the reduced oxygen content syngas contacts the solid catalyst to make hydrocarbon products and the hydrocarbon products are discharged via the hydrocarbon discharge port.

It should be appreciated that the oxygen and gaseous hydrocarbon inlets may be located in an integral mixing chamber that is in direct communication with the syngas reactor, such that the two reactant gases enter the mixing chamber and establish some level of mixing as they proceed to and come in contact with the catalyst material. Thus, the mixed gases would enter the syngas reactor through the same introduction means rather than through separate inlets.

It should also be appreciated that although the syngas inlet of the oxygen depletion zone is connected to the syngas product outlet of the syngas reactor, the connection need not be immediate or such that they are integral. The syngas or slip stream of syngas that is destined for the oxygen depletion zone may undergo additional processing as a transition from the syngas reactor to the oxygen depletion zone, i.e., temperature adjustment, water removal, etc. The same is true for the refined product outlet and reactant gas inlet of step (c) in the description above.

While preferred embodiments of this invention have been shown and described, modification thereof can be made by one skilled in the art without departing from the spirit or teaching of this invention. The embodiments described herein are exemplary only and are not limiting. Many variations and modifications of the system and apparatus are possible and are within the scope of this invention. For example, the Figures and some of the description suggest that the oxygen removal device or process is an independent or stand alone entity from the syngas reactor. However, it is within the scope of the invention that the oxygen removal device or process be an integral or integrated part of the syngas reactor. Also, many of the illustrations show reactors in parallel, however, reactors in series arc within the scope of the present invention. Likewise, some of the illustrations show reactors in which oxygen is transferred radially outward from an inner bore toward an annulus. It is fully within the scope of the present invention to have the transfer of oxygen from an annulus toward an inner bore. This can be accomplished by simply reversing the direction of the layers that make up the inner tube and the partial pressures of oxygen on either side of the membrane. Alternatively, the flow of oxygen can be between through any type wall of dense membrane and catalyst constructed in accordance with the tubular type walls described herein that separates adjacent or connected chambers of the appropriate gases.

Similarly, other alterations or manipulations in the specific details of the various embodiments expressed, illustrated or suggested herein can be made without departing from the spirit of the present invention. For example, the oxygen may be removed from the syngas by passing the oxygen containing syngas over a solid resin or other solid material that will remove the oxygen via adsorption, absorption or other chemical or physical sorption processes. Some of these types of materials can be found in U.S. Pat. Nos. 6,369,148 and 6,254,946, which are hereby incorporated by reference. Other methods may include consuming the oxygen by production of hydrogen peroxide. Accordingly, the scope of protection is not limited to the embodiments described herein, but is only limited by the claims, the scope of which shall include all equivalents of the subject matter of the claims.

What is claimed is:

1. A process for converting a hydrocarbon-containing feed gas to liquid hydrocarbon products comprising:
   (a) reacting the hydrocarbon-containing gas and an oxygen-containing gas in a syngas reactor under conditions effective to produce a first syngas stream comprising primarily hydrogen and carbon monoxide with a measurable amount of oxygen;
   (b) removing oxygen from the first syngas stream by passing at least a portion of the first syngas stream in step (a) over a catalyst that promotes a reaction between the unconverted oxygen and carbon monoxide to produce a second syngas stream wherein said second syngas stream comprises less unconverted oxygen than the first syngas stream; and
   (c) reacting at least a portion of the second syngas stream of step (b) in a synthesis reactor under conditions effective to produce, liquid hydrocarbon products.

2. The process of claim 1 wherein the reaction of step (b) is carried out at a temperature from about 20 to about 600° C.

3. The process of claim 1 wherein the reaction of step (b) is carried out at a temperature from about 50 to about 350° C.

4. The process of claim 1 wherein the reaction of step (b) is carried out at a temperature from about 50 to about 300° C.

5. The process of claim 1 wherein the catalyst of step (b) comprises a transition metal.

6. The process of claim 5 wherein the transition metal is selected from the group consisting of Rh, Ru, Pd, Pt, Au, Ag, Os, Ir, Sc, Ti, V, Cr, Mn, Fe, Co, Ni, Cu, Zn, Nb, Mo, Tc, Ru, Rh, Pd, Ag, Hf, Ta, W, Re, and combinations thereof.

7. The process of claim 5 wherein the catalyst further comprises an oxidized promoter selected from the group consisting of La, Ce, Pr, Nd, Pm, Sm, Eu, Gd, Tb, Dy, Ho, Er, Tm, Yb, Lu, Sc, Y, Th, and combinations thereof.

8. The process of claim 5 further comprising a support wherein the support comprises an oxide of an element selected from the group consisting of Be, Mg, Ca, Sr, Ba, Ra, B, Al, Ga, In, Tl, C, Si, Ge, Sn, Pb, and combinations thereof.

9. The process of claim 1 wherein the catalyst has the formula of $\alpha Pt\text{-}\beta CeO_2\text{-}\gamma Al_2O_3$.

10. The process of claim 9 wherein $\alpha$ is in the range of about 0.001 to about 0.1.

11. The process of claim 9 wherein $\beta$ is in the range of about 0.001 to about 0.5.

12. The process of claim 9 wherein $\gamma$ is in the range of about 0.5 to about 0.99.

13. The process of claim 1 wherein the concentration of oxygen in the second syngas stream produced in step (b) comprises less than 1000 ppm.

14. The process of claim 1 wherein the concentration of oxygen in the second syngas stream produced in step (b) comprises less than 100 ppm.

15. The process of claim 1 wherein the concentration of oxygen in the second syngas stream produced in step (b) comprises less than 10 ppm.

16. The process according to claim 1 wherein the oxygen removal process comprises a catalyst that will promote a reaction between oxygen and hydrogen.

17. The process according to claim 1 wherein the oxygen removal process comprises a catalyst that will promote a reaction between oxygen and methane.

18. The process of claim 17 wherein step (b) is carried out in an extended portion of the syngas reactor of step (a).

19. The process of claim 17 wherein step (b) is carried out in a separate vessel from the syngas reactor of step (a).

20. The process according to claim 1 wherein the oxygen removal process comprises a catalyst that will promote a reaction that consumes at least a portion of the oxygen present in the first syngas stream.

21. The process according to claim 20 wherein the catalyst comprises a supported transition metal.

22. The process according to claim 20 wherein the catalyst comprises at least one promoter comprising a rare-earth metal.

23. The process according to claim 20 wherein the support comprises a refractory support comprising an element selected from the group consisting of Be, Mg, Ca, Sr, Ba, Ra, B, Al, Ga, In, Tl, C, Si, Ge, Sn, Pb, and combinations thereof.

24. The process according to claim 20 wherein the catalyst adsorbs diatomic oxygen and a reactant and facilitates the reaction between oxygen and the reactant to form products.

25. The process according to claim 24 wherein the reactant is carbon monoxide.

26. The process according to claim 1 wherein the oxygen removal process comprises selectively separating oxygen from the syngas in the first syngas stream.

27. The process of claim 26 wherein the oxygen is separated using an oxygen selective membrane.

28. The process according to claim 1 wherein the oxygen removal process further comprises at least one additional process selected from the group consisting of:
   (a) a catalyst that will promote a reaction between oxygen and hydrogen or methane,
   (b) selectively separating oxygen from the synthesis gas,
   (c) oxygen selective adsorption,
   (d) pressure swing adsorption,
   (e) oxidation of Fischer-Tropsch wax,
   (f) functionalization of hydrocarbons,
   (g) absorption of oxygen using a liquid medium,
   (h) methane oxidation, (i) oxygen combustion, (j) hydrogen peroxide production, and (k) the use of oxygen by aerobic organisms, enzymes or combinations thereof.

29. The process of claim 1 wherein the hydrocarbon-containing feed gas in step (a) comprises natural gas.

30. The process of claim 1 wherein the concentration of oxygen in the second syngas stream produced in step (b) comprises less than 1000 ppm.

31. The process of claim 1 wherein the concentration of oxygen in the second syngas stream produced in step (b) comprises less than 100 ppm.

32. The process of claim 1 wherein the concentration of oxygen in the second syngas stream produced in step (b) comprises less than 10 ppm.

33. The process of claim 1 wherein the synthesis reactor in step (c) comprises a Fischer-Tropsch reactor.

34. The process of claim 1 wherein the synthesis reactor in step (c) comprises an alcohol synthesis reactor.

35. The process of claim 1 wherein the synthesis reactor in step (a) comprises catalytic partial oxidation.

* * * * *